United States Patent
Pawlik et al.

(10) Patent No.: US 11,607,065 B2
(45) Date of Patent: Mar. 21, 2023

(54) METHODS AND SYSTEMS FOR CONTROLLING AND MAINTAINING THE TEMPERATURE OF A DRINK WITHIN A DRINKING VESSEL

(71) Applicant: VoChill LLC, Austin, TX (US)

(72) Inventors: Randall Pawlik, Austin, TX (US); Lisa Pawlik, Austin, TX (US)

(73) Assignee: VoChill Inc., Austin, TX (US)

( * ) Notice: Subject to any disclaimer, the term of this patent is extended or adjusted under 35 U.S.C. 154(b) by 341 days.

(21) Appl. No.: 16/881,851

(22) Filed: May 22, 2020

(65) Prior Publication Data

US 2021/0361100 A1  Nov. 25, 2021

(51) Int. Cl.
  *A47G 23/02* (2006.01)
  *F16M 11/22* (2006.01)
  *F25D 21/14* (2006.01)

(52) U.S. Cl.
  CPC ......... *A47G 23/0216* (2013.01); *F16M 11/22* (2013.01); *F25D 21/14* (2013.01); *A47G 2023/0275* (2013.01)

(58) Field of Classification Search
  CPC .... A47G 23/0216; A47G 23/02; A47G 23/04; A47G 2023/0275; A47G 2023/0283; A47G 19/127; F16M 11/22; F25D 21/14; F25D 2331/809; F25D 2331/808
  See application file for complete search history.

(56) References Cited

U.S. PATENT DOCUMENTS

| | | | |
|---|---|---|---|
| 556,337 A | 3/1896 | Dawes | |
| 1,986,958 A | 1/1935 | Cooperstein | |
| 2,169,426 A | 8/1939 | Morton | |
| 2,657,891 A | 11/1953 | Haften | |
| 3,205,677 A | 9/1965 | Stoner | |
| 3,205,678 A | 9/1965 | Stoner | |
| 4,383,422 A * | 5/1983 | Gordon .............. | B65D 81/3886 220/592.16 |
| 4,726,553 A | 2/1988 | Wischusen, III | |
| 4,831,842 A | 5/1989 | Kelley et al. | |

(Continued)

FOREIGN PATENT DOCUMENTS

| | | |
|---|---|---|
| DE | 29913627 | 8/1999 |
| EP | 2769651 | 8/2014 |

(Continued)

OTHER PUBLICATIONS

Universal Drink Holder, https://www.amazon.com/beverage-universal-attached-wheelchairs-walkers/dp/B0062BU3J4, 6 pages, Web accessed on Mar. 28, 2018.

(Continued)

*Primary Examiner* — Anita M King
(74) *Attorney, Agent, or Firm* — Baker Botts L.L.P.

(57) ABSTRACT

Disclosed herein are systems for regulating a temperature of a drink, the system comprising: a receptacle system defining a recess for receiving a drinking vessel, including: an outer receptacle, and an inner receptacle that is removably couplable to the outer receptacle, wherein a cavity is defined between the outer receptacle and the inner receptable, the receptacle system comprising a top end portion, a bottom end portion, an inner wall portion, and an outer wall portion, the top end portion defines a top opening of the recess.

16 Claims, 34 Drawing Sheets

(56) References Cited

U.S. PATENT DOCUMENTS

| | | | |
|---|---|---|---|
| 4,852,843 A | 8/1989 | Chandler | |
| 4,961,555 A | 10/1990 | Egan, Jr. | |
| 4,986,089 A | 1/1991 | Raab | |
| 4,989,418 A | 2/1991 | Hewlett | |
| 5,147,067 A | 9/1992 | Effertz | |
| 5,207,076 A | 5/1993 | Sciarrillo | |
| 5,361,604 A * | 11/1994 | Pier | F25D 31/007 62/530 |
| 5,397,089 A | 3/1995 | Kataoka | |
| 5,579,949 A | 12/1996 | Dykes et al. | |
| 5,680,944 A | 10/1997 | Rueter | |
| 5,845,804 A | 12/1998 | Prescott | |
| 5,915,580 A | 6/1999 | Melk | |
| 5,960,984 A | 10/1999 | Weston | |
| 6,059,138 A | 5/2000 | Labruyere | |
| 6,073,796 A | 6/2000 | Mogil | |
| 6,405,892 B1 | 6/2002 | Volan | |
| 6,425,494 B1 | 7/2002 | Woods, II | |
| 6,575,417 B1 | 6/2003 | Krommenakker | |
| 7,000,801 B2 | 2/2006 | Rodriguez | |
| 7,201,285 B2 * | 4/2007 | Beggins | B65D 81/3881 215/396 |
| 7,516,931 B2 | 4/2009 | Sarullo | |
| 8,621,885 B1 * | 1/2014 | Niebolte | F25D 3/08 62/457.4 |
| 10,835,067 B2 * | 11/2020 | Rane | A47G 23/0266 |
| 10,947,026 B2 * | 3/2021 | Pawlik | A47G 23/0208 |
| 11,375,835 B2 * | 7/2022 | Sherburne | A47G 19/2288 |
| 2002/0130236 A1 | 9/2002 | Swensen | |
| 2003/0085233 A1 | 5/2003 | Winkleman | |
| 2004/0200739 A1 | 10/2004 | Escobar | |
| 2005/0082302 A1 | 4/2005 | Fischer | |
| 2006/0081750 A1 | 4/2006 | Kazyaka | |
| 2007/0125791 A1 | 6/2007 | Donnelly et al. | |
| 2009/0071581 A1 | 3/2009 | Britt et al. | |
| 2009/0294463 A1 | 12/2009 | Stack | |
| 2010/0206920 A1 | 8/2010 | Byrns et al. | |
| 2012/0091296 A1 | 4/2012 | Lee | |
| 2015/0342382 A1 | 12/2015 | D'Alesio | |
| 2016/0023585 A1 | 1/2016 | Salter et al. | |
| 2017/0137207 A1 * | 5/2017 | Mackintosh | B65D 81/3881 |
| 2018/0242765 A1 * | 8/2018 | Rane | A47G 23/0266 |
| 2020/0002079 A1 * | 1/2020 | Pawlik | B65D 81/3883 |

FOREIGN PATENT DOCUMENTS

| | | |
|---|---|---|
| EP | 3048007 | 7/2016 |
| FR | 1102305 | 10/1955 |
| GB | 2436677 | 10/2007 |
| WO | 1995030865 | 11/1995 |
| WO | 2010149171 | 12/2010 |

OTHER PUBLICATIONS

Duro-Med Wheelchair Cup Holder—Walker Cup Holder, Universal, Black; https://www.amazon.com/Duro-Med-Wheelchair-Cup-Holder-Universal/dp/B000EWXSUI/ref=pd_lpo_vtph_121_bs_t_1?_, 8 pages, Web accessed on Mar. 28, 2018.

Attwood Standard Beverage Holder; https://www.amazon.com/attwood-11670-4-Attwood-Standard-Beverage/dp/B001O0D6CY/ref=pd_bxgy_200_img_2?_encoding=, 7 pages, Web accessed on Mar. 28, 2018.

Cup Holder, 360° Rotating,Drink Bottle Cup,Stroller Cup Holder,Bicycle Bike Water Bottle Cage Holder; https://www.amazon.com/dp/B0732K39DX/ref=sspa_dk_detail_3?psc=1, 6 pages, Web accessed on Mar. 28, 2018.

International Search Report and Written Opinion, Application No. PCT/US2021/032943, dated Sep. 16, 2021, 15 pages.

\* cited by examiner

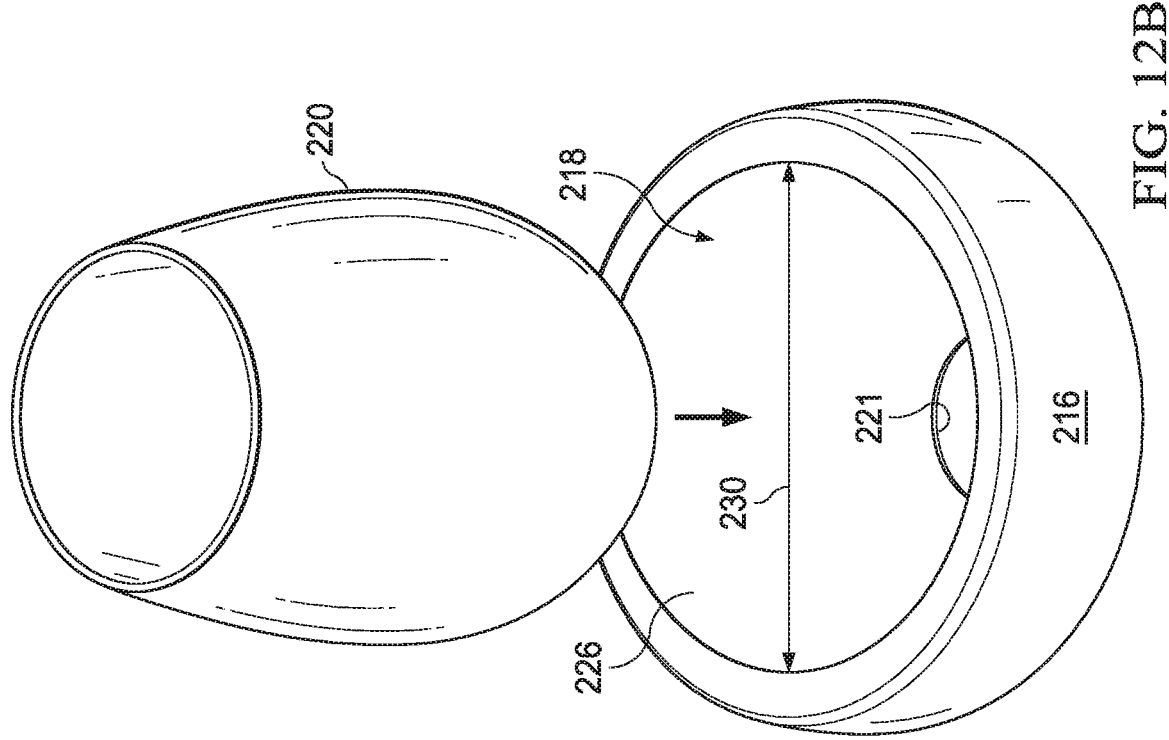
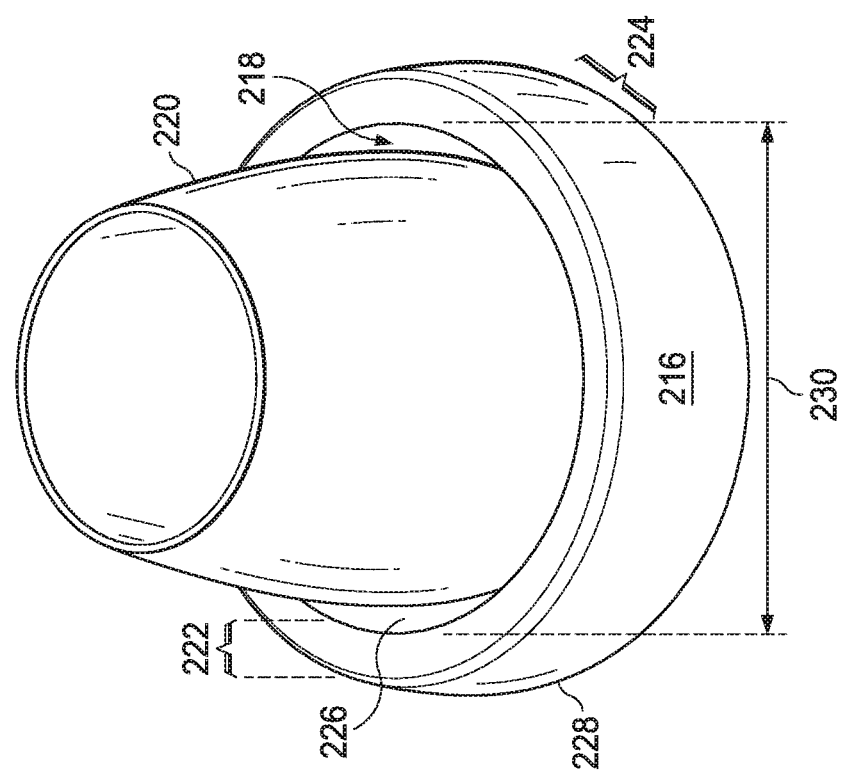

METHODS AND SYSTEMS FOR CONTROLLING AND MAINTAINING THE TEMPERATURE OF A DRINK WITHIN A DRINKING VESSEL

FIELD OF THE DISCLOSURE

The present disclosure relates to methods and systems for controlling and maintaining the temperature of a drink within a drinking vessel.

BACKGROUND

As a drink sits in a drinking vessel, the temperature of the drink rises or falls to ambient temperature instead of being maintained at, or changed to, a desired drinking temperature. Devices have been developed to maintain the temperature of a drink. One class of devices maintains a drink temperature by being inserted into the contents of the drinking vessel. Another class maintains temperature through beverage jackets (e.g., koozie, hugger, coozie). Another class is a specialized drinking vessel that itself is thermally insulated to maintain the temperature of the drink (e.g., tumbler or frozen glass). Another class includes tabletop containers that can chill a bottle of wine.

SUMMARY

Innovative aspects of the subject matter described in this specification may be embodied in a system that includes regulating a temperature of a drink, the system including a receptacle system defining a recess for receiving a drinking vessel, including: an outer receptacle, and an inner receptacle that is removably couplable to the outer receptacle, wherein a cavity is defined between the outer receptacle and the inner receptable, the receptacle system comprising a top end portion, a bottom end portion, an inner wall portion, and an outer wall portion, the top end portion defines a top opening of the recess.

These and other embodiments may each optionally include one or more of the following features. For instance, a stand for holding the receptacle system, the stand releasably attached to the receptable system. The stand includes a top end positioned opposite a bottom end, the top end of the stand proximate to an attachment point with the receptacle system, the stand further including a reservoir proximate to the top end of the stand. The outer receptacle includes a through hole positioned proximate to the reservoir when the receptacle system is attached to the stand. The outer receptacle includes one or more pathways positioned between an inner surface of the outer receptacle and an inner surface of the inner receptacle, the pathways terminating at the through hole. The stand includes a top end positioned opposite a bottom end, the top end of the stand proximate to an attachment point with the receptacle system, the stand further including a cavity proximate to the top end of the stand. The outer receptacle includes a protruding member, wherein when the receptacle system is attached to the stand, the protruding member is at least partially positioned within the cavity. The protruding member of the outer receptacle and the cavity of the stand include corresponding magnetic members to couple the receptacle system to the stand. The inner receptacle and the outer receptacle include corresponding magnetic members to couple the inner receptacle to the outer receptacle.

Innovative aspects of the subject matter described in this specification may be embodied in a system for regulating a temperature of a drink, the system including a receptacle system defining a recess for receiving a drinking vessel, including: an outer receptacle including a through hole and a protruding member, an inner receptacle that is removably couplable to the outer receptacle, the receptacle system comprising a top end portion, a bottom end portion, an inner wall portion, and an outer wall portion, the top end portion defines a top opening of the recess, wherein a cavity is defined between the outer receptacle and the inner receptable; and a stand for holding the receptacle system, the stand releasably attached to the receptable system; and the stand including a top end positioned opposite a bottom end, the top end of the stand proximate to an attachment point with the receptacle system, the stand further including i) a cavity proximate to the top end of the stand and corresponding to the protruding member for attaching the receptacle system to the stand and ii) a reservoir proximate to the top end of the stand and the through hole of the outer receptacle.

These and other embodiments may each optionally include one or more of the following features. For instance, the outer receptacle includes one or more pathways positioned between an inner surface of the outer receptacle and an inner surface of the inner receptacle, the pathways terminating at the through hole. When the receptacle system is attached to the stand, the protruding member is at least partially positioned within the cavity. The protruding member of the outer receptacle and the cavity of the stand include corresponding magnetic members to couple the receptacle system to the stand. The inner receptacle and the outer receptacle include corresponding magnetic members to couple the inner receptacle to the outer receptacle.

Innovative aspects of the subject matter described in this specification may be embodied in a method for regulating a temperature of a drink, the method including placing an inner receptacle in a cooling environment with a cooling temperature, the cooling temperature below room temperature; removing the inner receptacle from the cooling environment; attaching the inner receptacle to an outer receptacle, the inner receptacle and the outer receptacle forming a receptacle system; standing the receptacle system upright; pouring a drink into a drinking vessel; and placing the drinking vessel into a recess defined by the receptacle system while the receptacle system is standing upright.

These and other embodiments may each optionally include one or more of the following features. For instance, releasably attaching the receptacle system to a stand. Removing condensation that is collected at a reservoir of the stand.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present disclosure and its features and advantages, reference is now made to the following description, taken in conjunction with the accompanying drawings, which depict various embodiments of the disclosure.

FIG. 12A is a schematic diagram of a system for controlling the temperature of a drink with a receptacle holding a stemless drinking vessel.

FIG. 12B is a schematic diagram of the system and drinking vessel of FIG. 12A, with the drinking vessel removed from the receptacle.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As will be described in further detail, the inventors of the present disclosure have developed systems and methods for controlling and maintaining the temperature of a drink within a drinking vessel. The systems and methods may allow for better and more convenient temperature control of the drink and thereby better enjoyment of the drink by a user.

Figure 1A:
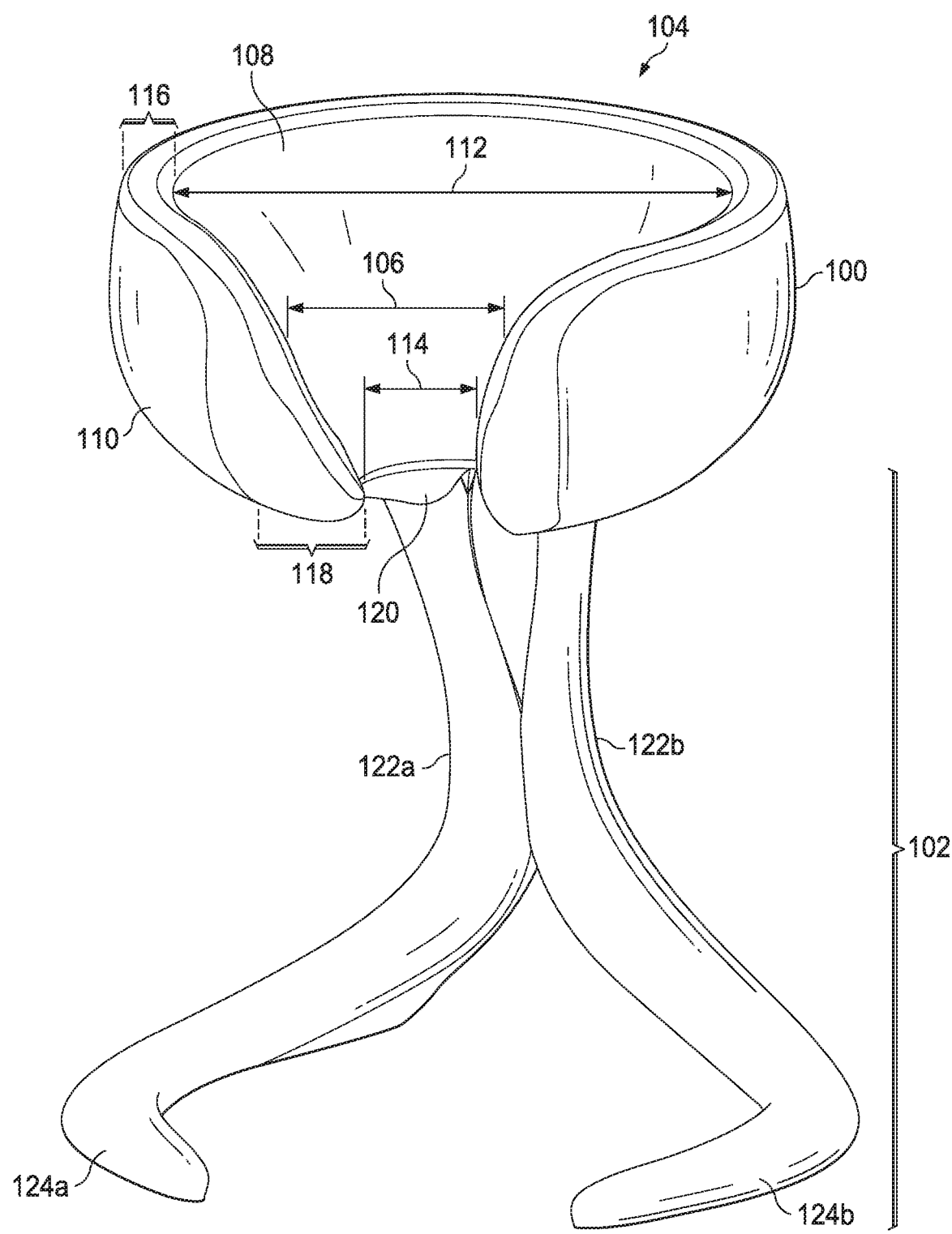
FIG. 1A is a schematic diagram of a system for controlling the temperature of a drink, the system including a receptacle releasably attached to a stand.

A user may pour a drink into a drinking vessel and use the system to maintain and control the temperature of the drink. In one example of a system, the system includes a receptacle and a stand. A user may cool or warm the receptacle by placing the receptacle in a freezer or microwave, for example. After waiting for the receptacle to reach a temperature, the user can remove the cooled or warmed receptacle and use the receptacle to hold a drinking vessel containing a drink. As the receptacle holds the drinking vessel, thermal energy is transferred from the drinking vessel to the cooled receptacle or from the heated receptacle to the drinking vessel. The receptacle, by holding the drinking vessel and transferring thermal energy, cools or warms the drinking vessel and maintains and controls the drink's temperature, prolonging the time the drink is cool or warm. The receptacle may be releasably attached to the stand to enable the receptacle to hold, for example, a stemmed wine glass. FIG. 1A depicts such a system, where a user can control the temperature of a drink within a drinking vessel by placing the drinking vessel in a cooled or warmed receptacle.

As shown by example in FIG. 1A, the system may include a receptacle 100 releasably attached to a stand 102. The receptacle 100 and stand 102 may be made from one or more of a variety of materials including plastic, wood, metal, ceramic, or a combination thereof and may include a textured surface to allow for easier grip. The receptacle 100 defines a recess 104 to receive and hold a drinking vessel. The recess formed by the receptacle 100 may take a variety of shapes and be contoured to define a recess to receive a variety of drinking vessels having different shapes.

In general, the receptacle 100 controls or maintains temperature by contacting a drinking vessel. By contacting the drinking vessel where the drinking vessel contains the drink, such as the lower part of the bowl of a wine glass, the receptacle 100 can efficiently enable the transfer of thermal energy between the heated or cooled receptacle 100 and the drink.

A side opening 106 may allow a drinking vessel such as a stemmed wine glass to be easily received and still securely held by the recess 104. The user may easily place a stemmed wine glass into the receptacle 100 by placing the stem of the wine glass through the side opening 106 and setting the bowl of the wine glass in the receptacle 100. The side opening 106 also allows parts of a drinking vessel to be viewed while the receptacle 100 holds the drinking vessel. As depicted in FIG. 1A, the side opening 106 may extend laterally from an inner wall portion 108 to an outer wall portion 110. As also shown by example in FIG. 1A, the side opening 106 may also extend vertically from a top opening 112, defined by a top end portion 116 of the receptacle 100, to a bottom opening 114, defined by a bottom end portion 118 of the receptacle 100. The outer wall portion 110 and inner wall portion 108 connect the top end portion 116 and bottom end portion 118. The side opening 106 allows the user to view their drink but is not so great in size as to let a drinking vessel fall through the receptacle 100 or to eliminate the temperature control and maintenance benefits of the system.

The bottom end portion 118 as shown in FIG. 1A is substantially C-shaped and defines a bottom opening 114 of the recess 104. The bottom opening 114 may be small enough such that a drinking vessel does not fall through the bottom opening 114, but large enough such that at least part of a stem of a drinking vessel may extend through the bottom opening 114.

The top end portion 116 as shown in FIG. 1A is also substantially C-shaped. As also shown by example in FIG. 1A, the top end portion 116 defines a top opening 112 of the recess 104. The top opening 112 may allow the recess 104 to receive a drinking vessel. As shown in FIG. 1A, the top opening 112 may have a larger cross-sectional area than the bottom opening 114.

One problem that may occur when a user drinks a cooled drink, or uses other temperature controlling systems, is that condensation accumulates on the drinking vessel or temperature controlling system. When the condensation accumulates, it may drip onto a user's hand, causing the user inconvenience. Moisture may also accumulate and drip onto a foot of a wine glass, for example. When the user drinks from the wine glass, the user may inadvertently pour the moisture from the foot of the wine glass onto the user or other undesired locations, such as the user's dinner plate. The system allows for enjoyment of a drink with reduced or eliminated condensation accumulating at undesired locations.

To reduce unwanted user contact with condensation, the bottom end portion 118 of the receptacle 100 includes a lip 120. The lip 120 is shown as the lowest point of receptacle 100. When condensation accumulates on the system or drinking vessel, it may sweat downward to the lip 120. As shown in FIG. 1A, the lip 120 is located away from the side opening 106 where the user may grab a drinking vessel and away from a location where the condensation will drip onto a stem of a wine glass, for example. As shown in FIG. 1A, the lip 120 is shaped as two or more peaks. The lip 120 is shaped to extend outwardly from the receptacle 100 or the stand 102. With the lip 120, condensation that sweats onto the drinking vessel or onto the user is reduced or eliminated. With the lip 120, condensation may be redirected from the receptacle 100 to the stand 102 and down to the supporting surface upon which the stand 102 is placed. The system may be alternatively configured such that the lip 120 is shaped as a single peak, a ridge, a plurality of ridges, or a combination thereof. The lip 120 may also be part of the stand 102.

The system includes the stand 102 to hold the system upright, to allow use with stemmed drinking vessels, or both. The stand 102 is elongated so that a drinking vessel is lifted off a supporting surface. Although shown as elongated, the stand 102 may be substantially flat. The receptacle 100 may also have a flat bottom end portion such that the receptacle 100 may stand upright without a stand 102. As shown in FIG. 1A, the stand 102 holds the receptacle 100 upright with the top end portion 116 substantially above the bottom end portion 118. The stand 102 also has one or more stand prongs 122a and 122b. The stand prongs 122a and 122b extend radially outward from the receptacle 100 to provide a wide base and sturdiness to prevent the system or drinking vessel from toppling over. The stand 102 also has one or more feet 124a and 124b for contacting a surface. The feet 124a and 124b may contact the supporting surface, such as a tabletop or the ground, thereby holding the stand 102 upright.

The system shown in FIG. 1A offers many advantages over previous systems. One advantage of the system is that a user may control and maintain the temperature of their drink while using their own drinking vessel. The user does not have to drink out of a large or lesser quality drinking vessel, such as a bulky insulated container, which may control temperature but diminishes the drinking experience. Another advantage is that the drinking vessel and drink may be viewed while in use, as opposed to a system that prevents viewing, such as a koozie. Viewing a drink enhances the user's experience by allowing the user to enjoy the color of the drink, for example. An additional advantage of the system is that the user may fine-tune the temperature to their liking. For example, the user may simply lift their drinking vessel from the receptacle and hold or set the drinking vessel directly on a supporting surface to allow the drink to warm slightly. The user may place the drinking vessel in the receptacle as the user desires to fine-tune the temperature. When using a tumbler, instead of the system in FIG. 1A for example, the user may not simply remove the drink from a tumbler and place the drink back into the tumbler. A further advantage of the system shown in FIG. 1A is that it reduces the condensation that drips onto the user's hand. The system also is advantageous in that it is shaped to resist toppling over.

Figure 1B:
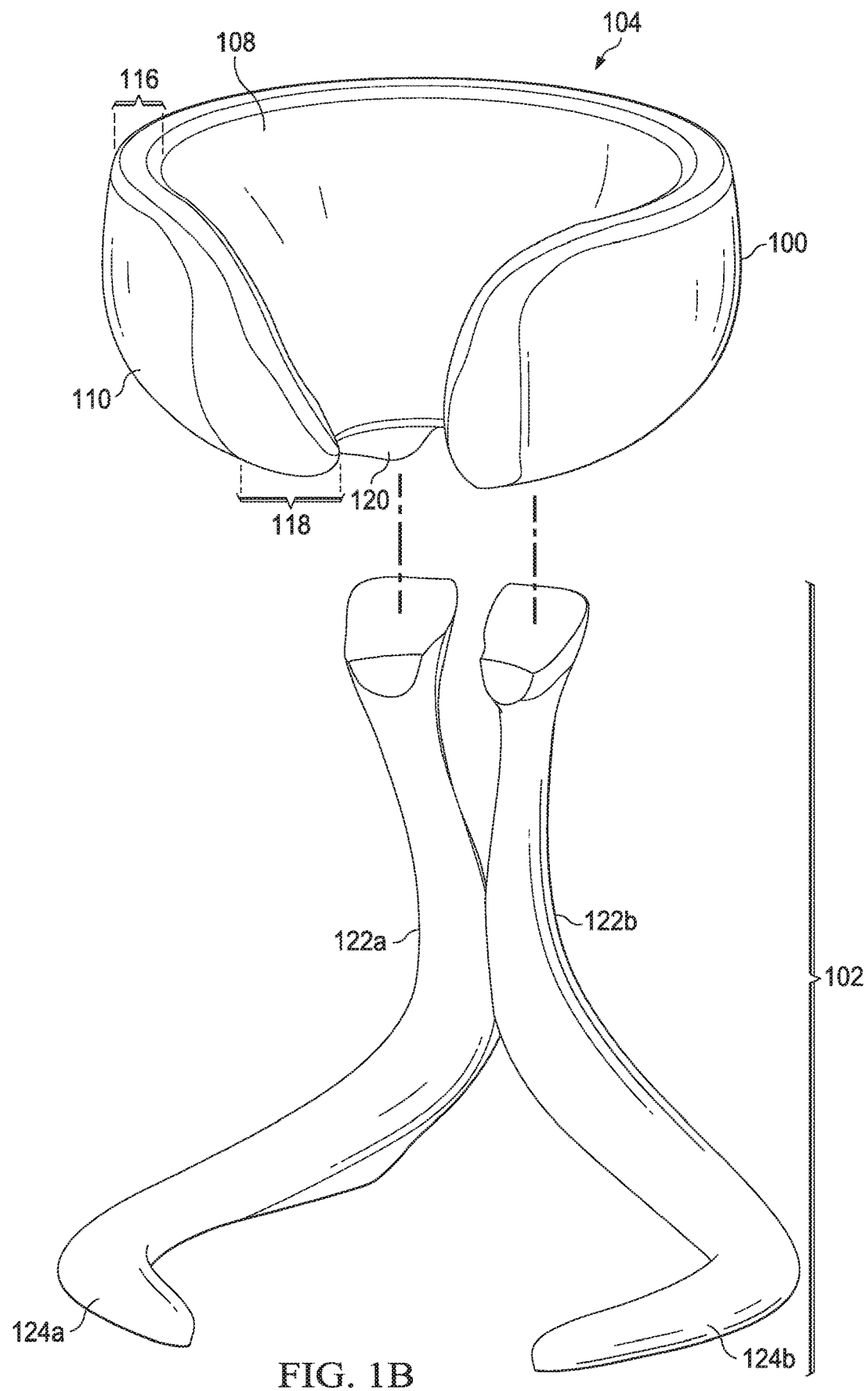
FIG. 1B is a schematic diagram of the system of FIG. 1A, with the receptacle detached from the stand.

One advantage of the system is that the system may include releasably attachable components. For example, FIG. 1B shows the system of FIG. 1A, with the receptacle 100 detached from the stand 102. When the system has a receptacle 100 that is detachable, a user may place only the receptacle 100 in a cooling environment (such as a freezer or refrigerator) or heating environment (such as an oven, microwave, or heat lamp) without the stand 102. The cooling environment and heating environment may be any environment where the temperature is below or above room temperature, respectively. A user may save space in the cooling or heating environment by detaching the stand 102 and placing only the receptacle 100 in the cooling or heating environment.

Detachability using a common attachment shape also allows for modularity, for example, a system where the stand 102 can releasably attach to numerous receptacles with the same or different shapes. Detachability allows one or more receptacles to be placed in a cooling or heating environment while another receptacle is in use, attached to the stand 102, or both. The user may detach a first receptacle from a stand and replace the first receptacle with a second receptacle that is cooled or heated. Therefore, a user may enjoy a first drink with the first receptacle and, when the user is ready for a second drink, the user may use a second receptacle that is already cooled or heated. The user can enjoy each drink at a desired temperature. Detachability also allows the stand to remain at a comfortable temperature for the user to handle. Detachability further allows modularity in that the receptacle 100 may be used with a plurality or variety of stands. The receptacle 100 may attach to the stand 102 by mating parts such as a pin and hole, magnets, a hinge, joint, or any other attachment mechanism. When the system has multiple receptacles or stands, some or all receptacles and some or all stands may have common attachment shapes, allowing for a system with interchangeable, modular parts. For example, every receptacle can include the same-shaped hole and every stand can include the same-shaped pin to connect to the hole. As an additional example, every receptacle may have a magnet with the same-shaped contacting surface and every stand may have a magnet with the same-shaped contacting surface. Detachability also allows for the receptacle 100 to be used with different-shaped stands, as described later. As also described later, detachability allows for a stand 102 to be used with different-shaped receptacles. In some systems, the receptacle 100 may be fixedly attached to the stand 102.

Figure 1C:
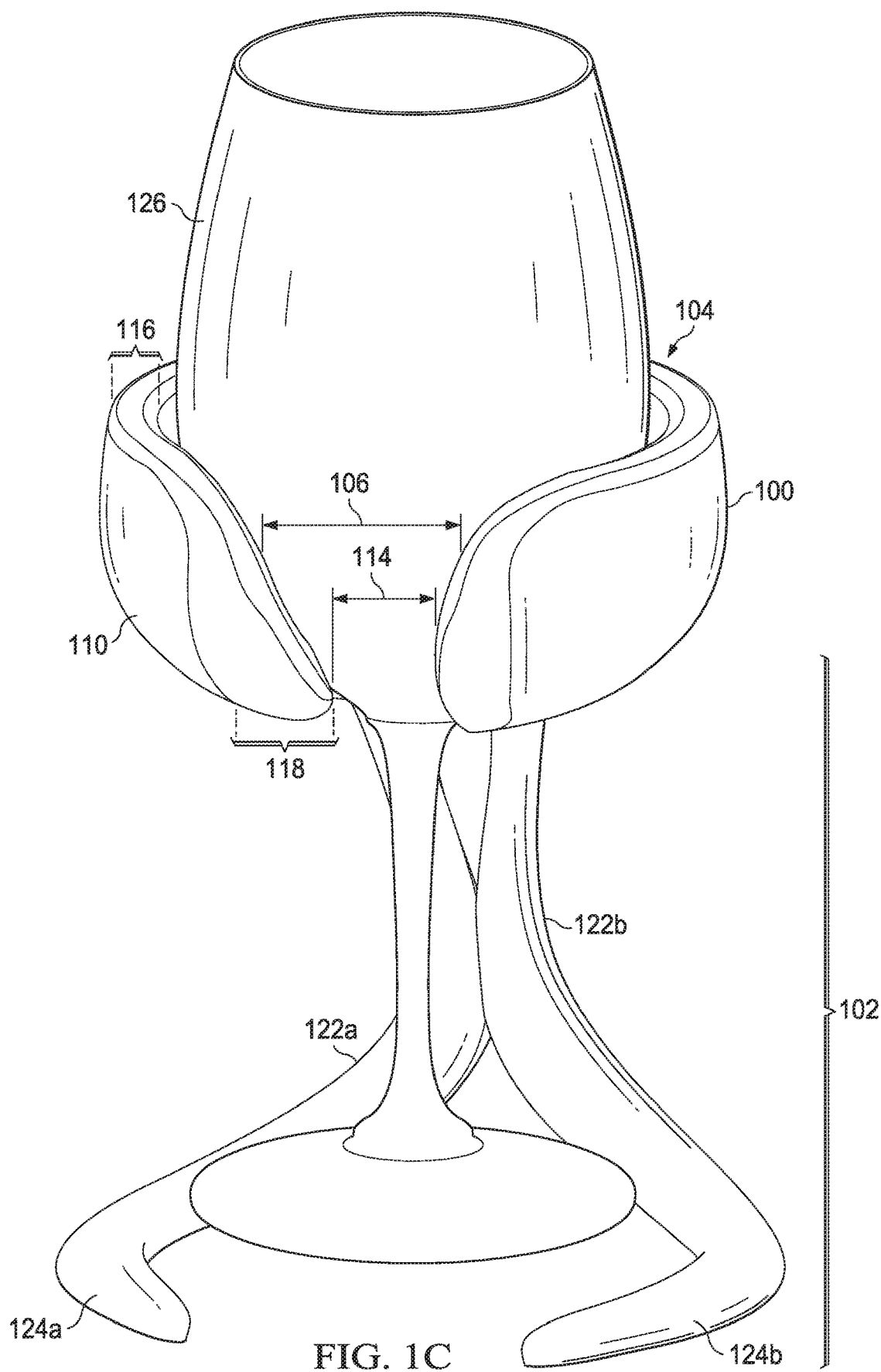
FIG. 1C is a schematic diagram of the system of FIG. 1A, with the receptacle holding a drinking vessel with a first shape.
Figure 2A:
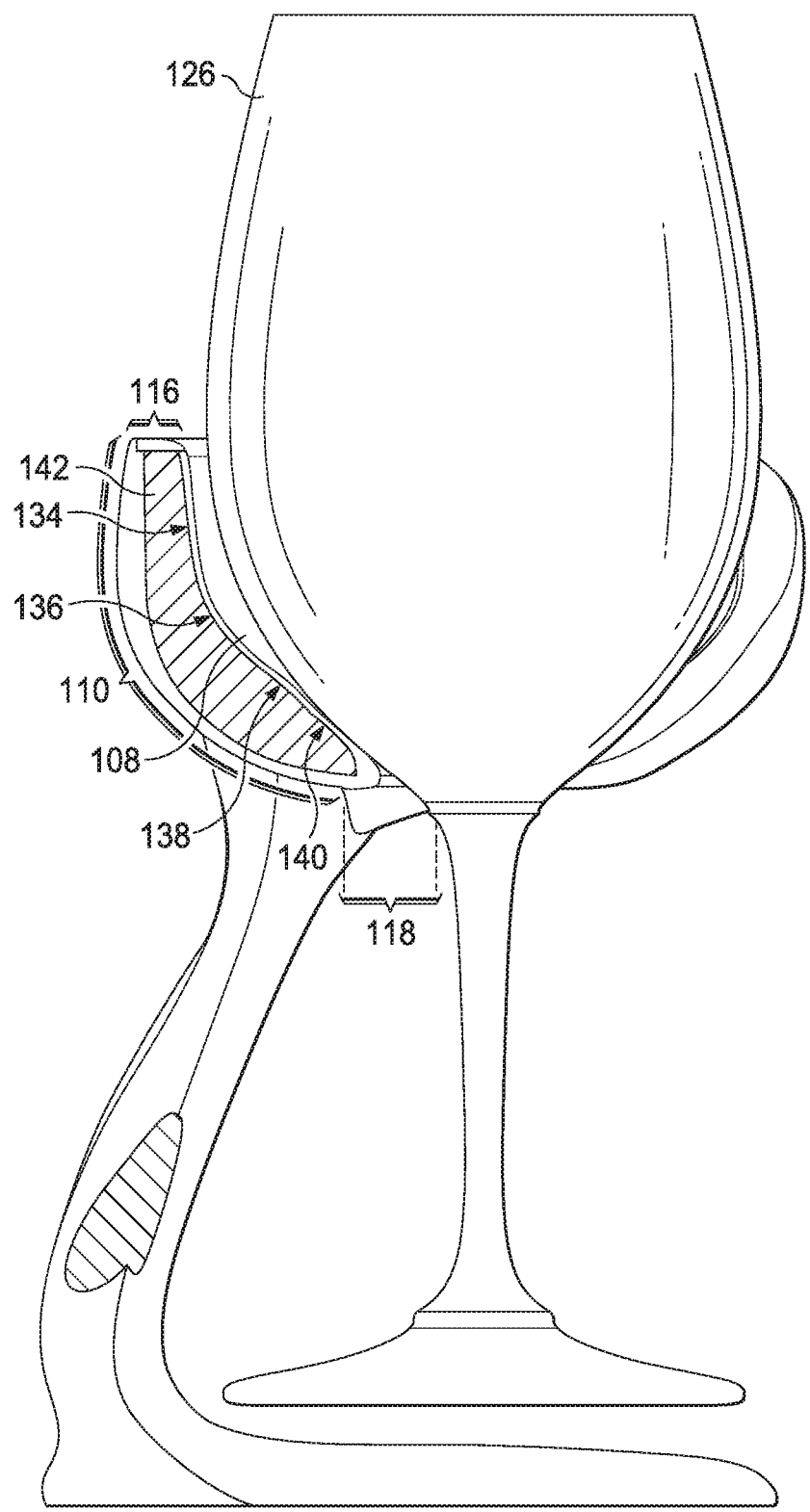
FIG. 2A is a schematic cross-sectional partial view of the receptacle of FIG. 1A holding the drinking vessel with the first shape of FIG. 1C.
Figure 2B:
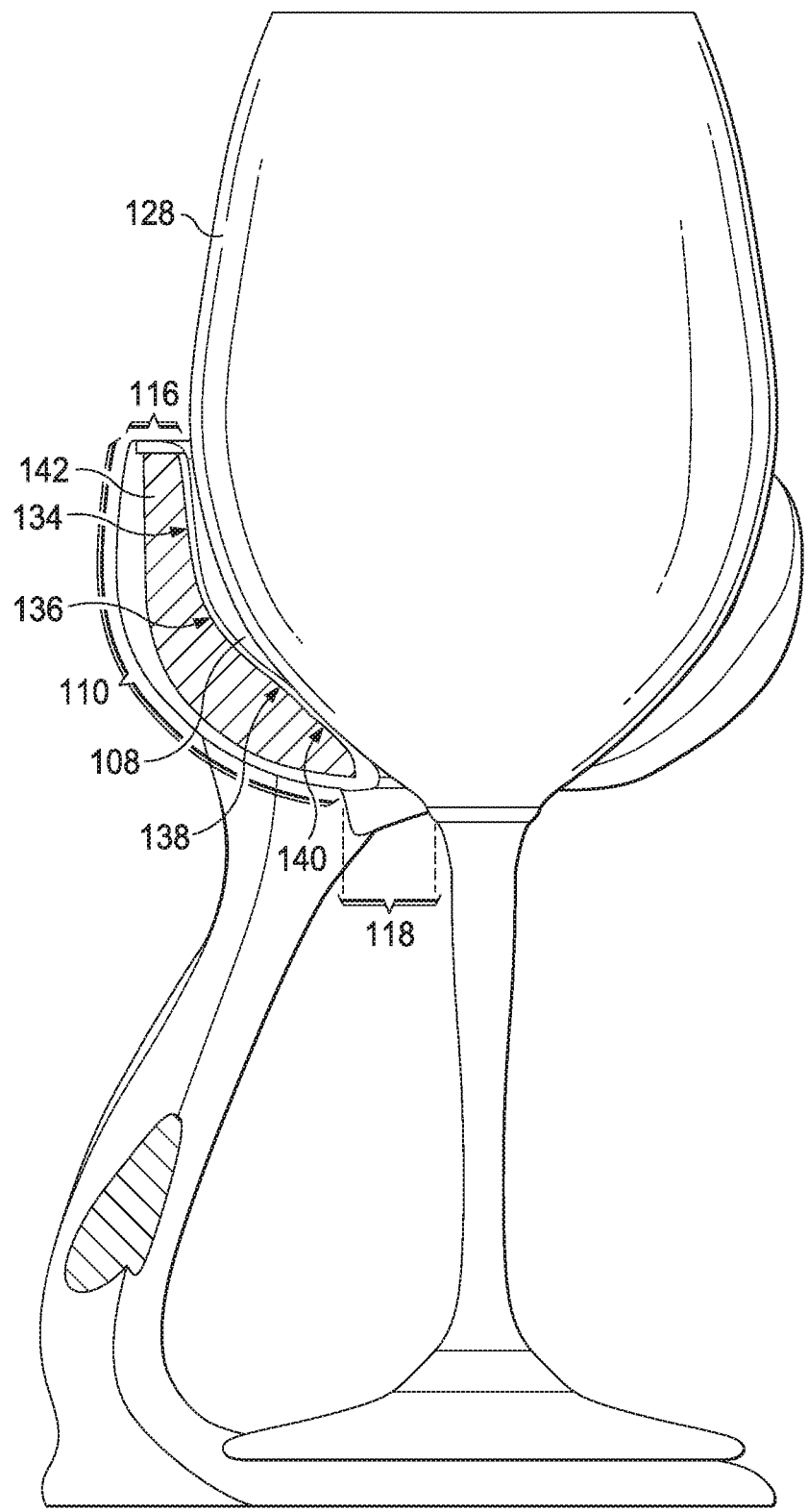
FIG. 2B is a schematic cross-sectional partial view of the receptacle of FIG. 2A holding a drinking vessel with a second shape.
Figure 2C:
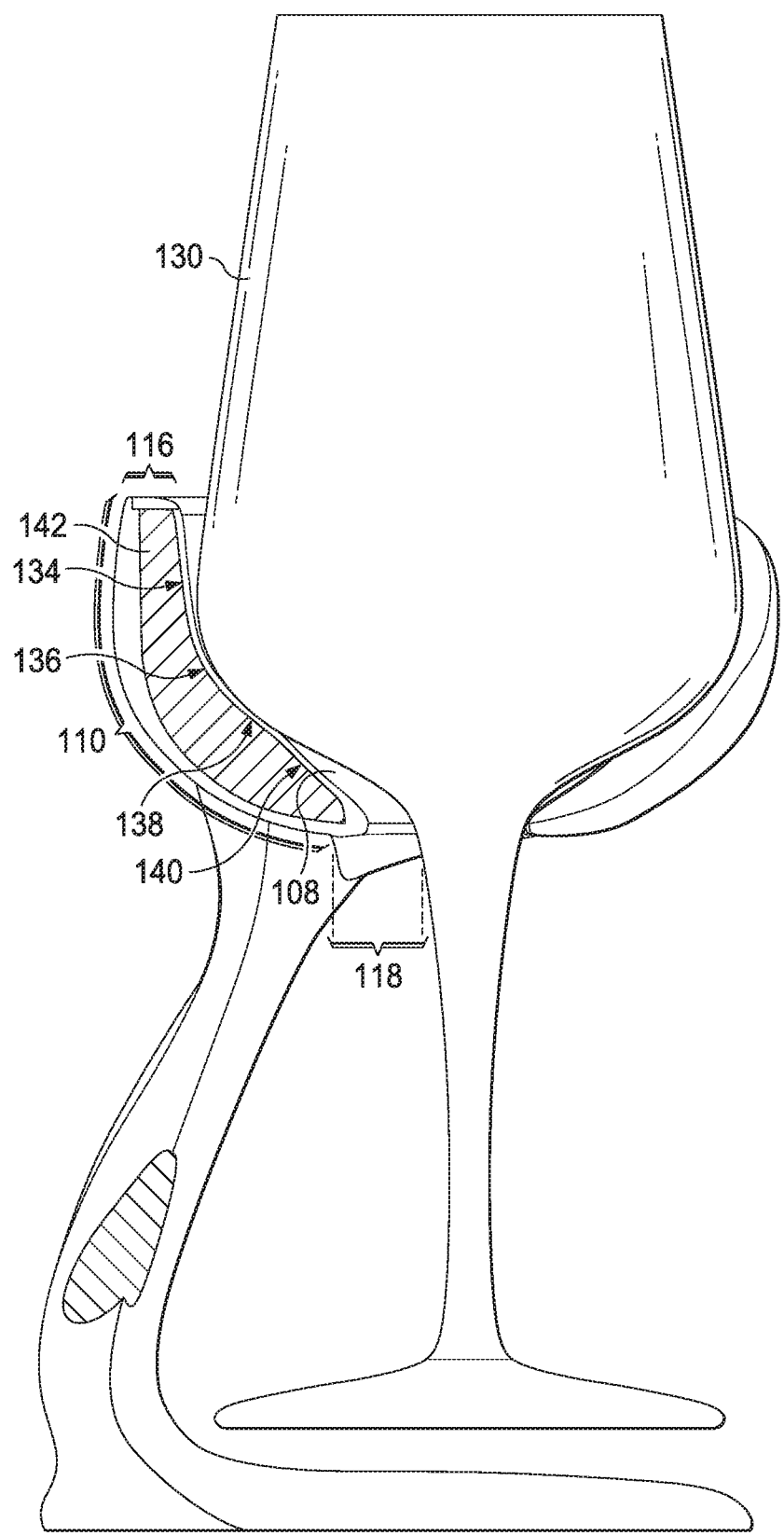
FIG. 2C is a schematic cross-sectional partial view of the receptacle of FIG. 2A holding a drinking vessel with a third shape.
Figure 2D:
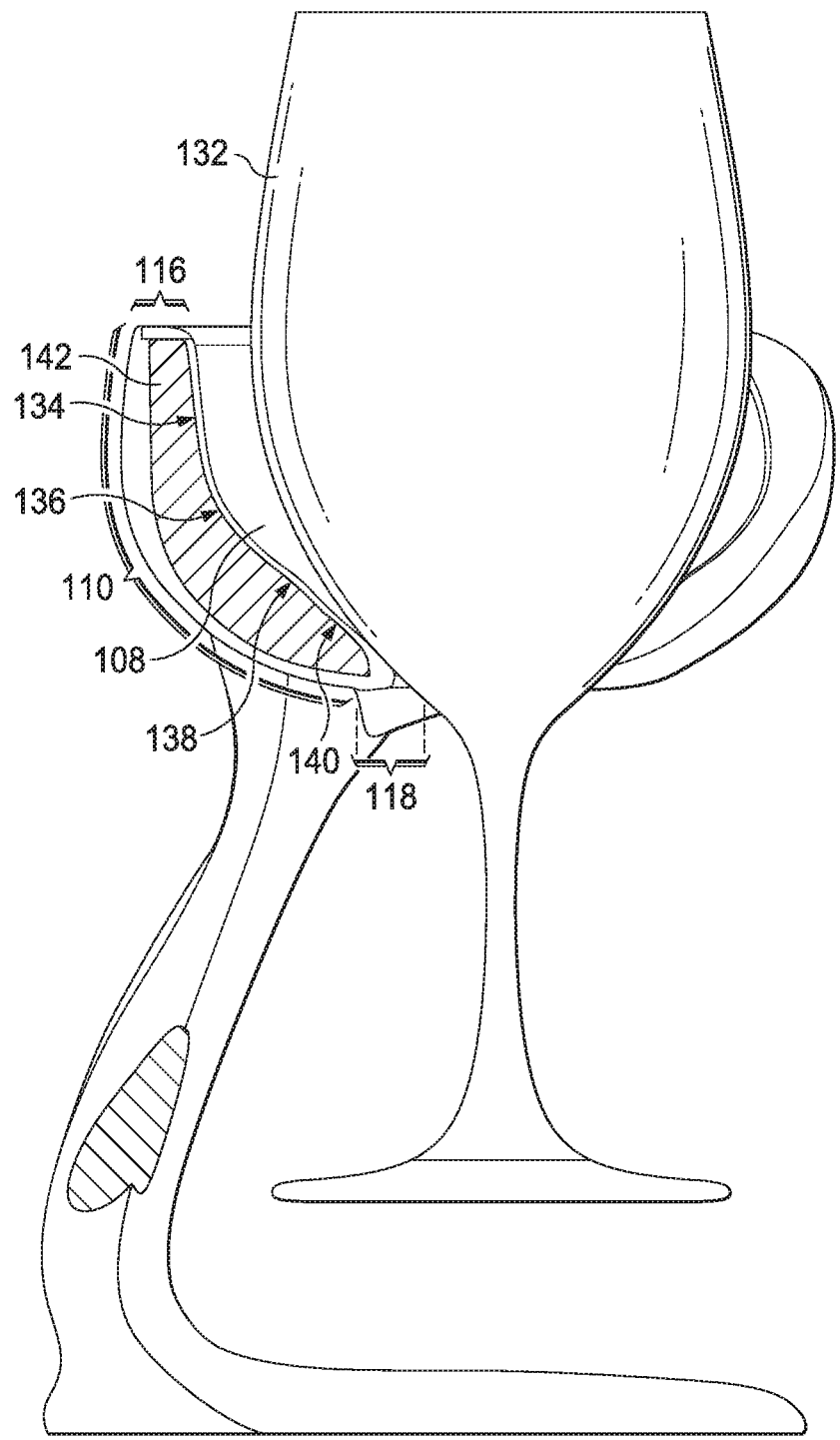
FIG. 2D is a schematic cross-sectional partial view of the receptacle of FIG. 2A holding a drinking vessel with a fourth shape.
Figure 2E:
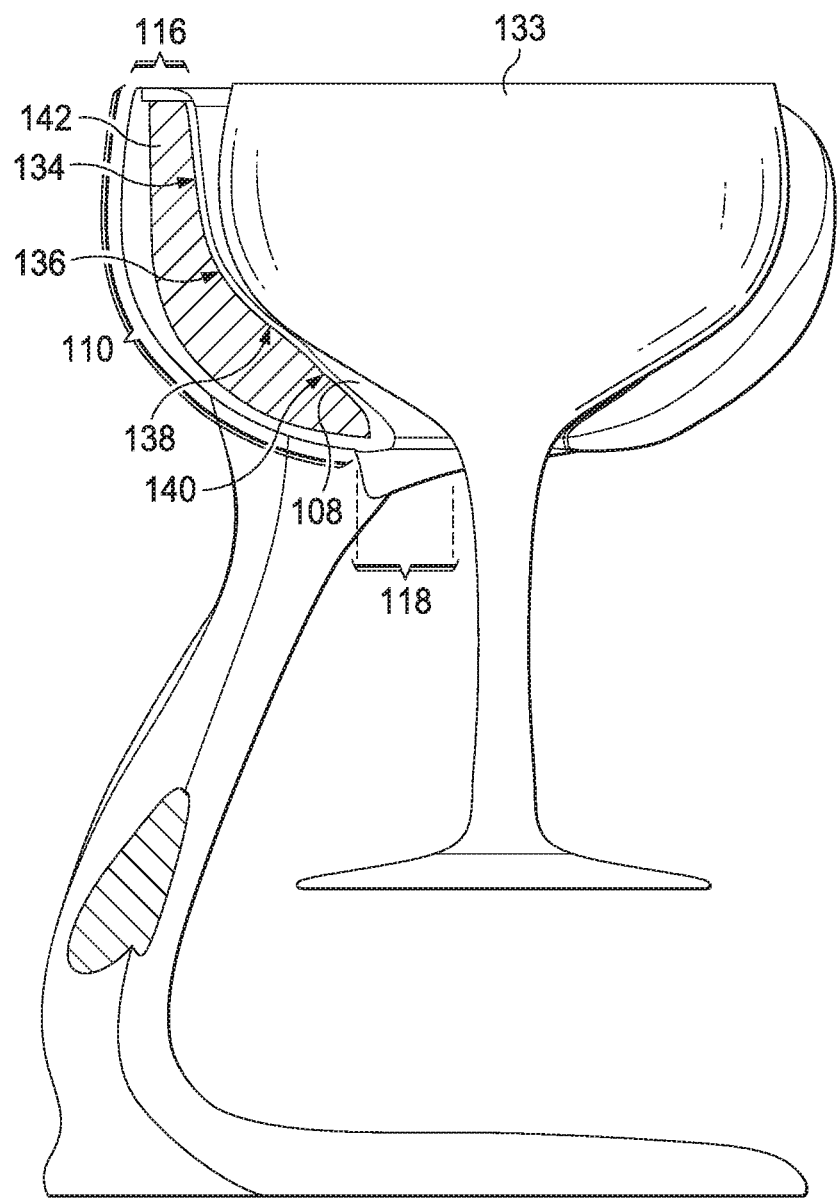
FIG. 2E is a schematic cross-sectional partial view of the receptacle of FIG. 2A holding a drinking vessel with a fifth shape.

As an example of how the system holds a drinking vessel, FIG. 1C depicts the system of FIGS. 1A and 1B holding a drinking vessel 126 with a first shape. After the receptacle 100 is removed from a cooling or heating environment, the receptacle 100 may be releasably but securely attached to the stand 102. The drinking vessel 126 may then be held by the receptacle 100, and the receptacle 100 may contact lower portions of the drinking vessel 126 nearest the drinkable fluid, thereby maintaining and controlling the drink's temperature efficiently.

As viewable in FIG. 1C, the top end portion 116 and bottom end portion 118 are substantially C-shaped about the drinking vessel 126. The bottom opening 114 is small enough such that the drinking vessel 126 does not fall through the bottom opening 114, but large enough such that the stem of the drinking vessel 126 extends through the bottom opening 114.

While holding the drinking vessel 126, at least part of the receptacle 100 may contact the drinking vessel 126 while the recess 104 of the receptacle 100 receives the drinking vessel 126. The contact of the drinking vessel 126 by the receptacle 100 allows the system to efficiently transfer thermal energy, thereby controlling and maintaining the temperature of the drinking vessel 126. The side opening 106 allows parts of the drinking vessel 126 to be viewed while the system holds the drinking vessel 126. The system need not have a side opening. Without the side opening 106, the system may even more efficiently control and maintain the temperature of a drink by fully enclosing the drinking vessel. But a system that allows a user to view the drink while enjoying the drink may enhance a user's experience. For example, the user may enjoy watching bubbles rise in their champagne. The user may enjoy viewing the caramel color of their scotch or the deep red of their Bordeaux. The side opening 106 also allows the stemmed drinking vessel 126 to be easily placed within and removed from the recess 104. The stand 102 may be elongated so that the drinking vessel 126 is lifted off a supporting surface as shown in FIG. 1C. A drinking vessel may need to be lifted off of a supporting surface if, for example, the drinking vessel has a stem.

The system as shown allows for use with a drinking vessel 126 designed to be used with a particular drink. The drinking vessel 126 is designed for red wine. A user may wish to enjoy a drink out of a drinking vessel designed for a particular drink. For example, the user may enjoy using a champagne flute for champagne as the champagne flute itself creates a long path for champagne bubbles to rise. A user may also wish to enjoy drinks out of glasses other than champagne flutes, such as a martini out of a coupe. As a further example, many wine glasses are shaped differently to direct the flow of a specific wine variety onto parts of the user's tongue or affect the aromas that a user smells. Drinking vessels may also have aesthetic qualities such as thin or decorative glass that is unmatched by bulky insulated containers. The system is advantageous in that it allows a user to enjoy a temperature-controlled drink out of the drinking vessel specifically designed for that drink.

The system also allows for controlling the temperature of a drink without inserting a foreign object into the drink itself. Such a foreign object may decrease enjoyment of the drink by adding weight to the drinking vessel, changing the feel of the drinking vessel, affecting taste and smell of the drink, causing unwanted contact of the user's lips or face with the foreign object, and decreasing the aesthetic value of a drinking vessel containing a drink. The system allows a user to enjoy drinking from a drinking vessel 126, while the drink's temperature is controlled and maintained, without diminishing the enjoyment of the drink with a foreign object. An additional advantage of the system is that the user may fine-tune the temperature to their liking. For example, the user may simply lift their drinking vessel from the receptacle and hold or set the drinking vessel directly on a supporting surface to allow the drink to warm slightly. In systems that use a foreign object placed within the drink contents, it may be difficult for a user to fine-tune the temperature of their drink because the user will have to insert their hand into the drink contents.

Although the drinking vessel 126 is shown having a first shape, the system may be used with a variety of drinking vessels with different shapes. The system may hold different-shaped drinking vessels, such as a red wine glass, a Bordeaux glass, a Burgundy glass, a white wine glass, a stemmed wine glass, a stemless wine glass, a round wine glass, a wine glass with angled edges, a champagne flute, a pint glass, a whiskey glass, a martini glass, a coupe glass, a glass with any variety of shapes, a can, a bottle, or any other vessel used to contain a drink. As will be described herein, the receptacle 100 can be shaped to provide surface-to-surface contact with numerous different-shaped drinking vessels. Another way the system can be used with different-shaped drinking vessels is by having numerous receptacles defining different recess for receiving a variety of different-shaped drinking vessels.

FIGS. 2A, 2B, 2C, 2D, and 2E provide examples of how the system of FIGS. 1A through 1C may be used with different-shaped drinking vessels. The receptacle 100 may define a recess that can receive a variety of different drinking vessels, such as the drinking vessel 126 with the first shape of FIG. 1C, shown in FIG. 2A. The recess may also receive a drinking vessel 128 with a second shape shown in FIG. 2B, a drinking vessel 130 with a third shape shown in FIG. 2C, a drinking vessel 132 with a fourth shape shown in FIG. 2D, and a drinking vessel 133 with a fifth shape shown in FIG. 2E. The drinking vessels 126, 128, 130, and 132 are wine glasses. The drinking vessel 133 is a coupe glass. The receptacle 100 may be shaped to allow for a large surface area of the inner wall portion 108 to contact drinking vessels of a variety of different shapes and sizes. Increased contact area allows more efficient temperature control because the thermal energy transfer is dependent on how much surface of the drinking vessel is contacted near the drink. In the exemplary embodiment shown in FIGS. 2A through 2E, the inner wall portion 108 is specially shaped with a multivessel contour to contact a large surface area of a variety of different-shaped drinking vessels near where the drink is contained.

An example of the multivessel contour is depicted in FIGS. 2A through 2E. At the top end portion 116, a top incline 134 has a top slope. "Slope" in this disclosure refers to the mathematical numerical descriptor. When the receptacle is sitting upright and is holding a drinking vessel, the top slope may have a magnitude such that the top incline 134 is nearly perpendicular to the supporting surface upon which the system stands. The top incline 134 contacts the drinking vessel 128 in FIG. 2B and contacts the drinking vessel 130 in FIG. 2C.

The inner wall portion 108 may also have a curved surface 136. The curved surface 136 may better accommodate drinking vessels that have wide bowls, angular edges, or both. The curved surface 136 connects the top incline 134 and a middle incline 138. The curved surface 136 is shown as having a smooth surface but may be jagged or may include a combination of smooth and jagged surfaces to more firmly hold a drinking vessel or to accommodate other drinking vessels. Although jagged surfaces may decrease surface area contact, jagged surfaces may prevent slippage. The curved surface 136 contacts the drinking vessel 130 in FIG. 2C and the drinking vessel 133 in FIG. 2E. The middle incline 138 may have a middle slope of less magnitude than the top slope of the top incline 134. The middle incline 138 accommodates drinking vessels that may curve inwardly towards the bottom of the bowl of the drinking vessel. The middle incline 138 contacts the drinking vessel 130 in FIG. 2C and the drinking vessel 133 in FIG. 2E. The middle incline 138 is connected to a bottom incline 140 at the bottom end portion 118. The bottom incline 140 may have a bottom slope of greater magnitude than the middle slope of the middle incline 138 and less magnitude than the top slope of the top incline 134. The bottom incline 140 allows for a larger surface area of the receptacle to contact narrow drinking vessels, for example. The bottom incline 140 contacts the drinking vessel 126 in FIG. 2A, the drinking vessel 128 in FIG. 2B, the drinking vessel 130 in FIG. 2C, the drinking vessel 132 in FIG. 2D, and the drinking vessel 133 in FIG. 2E.

The system is therefore advantageous over other systems as it can control the temperature of a variety of different drinking vessels with different shapes. FIGS. 2A through 2E provide five examples of how a receptacle with one shape can hold different-shaped drinking vessels to provide suitable surface area contact to provide thermal conduction. The system may also be configured such that the inner wall portion 108 includes convex contours, concave contours, or both to provide surface contact area for particular drinking vessels.

An additional advantage of the system, viewable in FIGS. 2A through 2E, is an inner cavity 142. The inner cavity 142 allows for efficient and long-lasting temperature control, insulation, or a combination thereof. For example, the inner cavity 142 may carry and contain a liquid solution. When placed in the freezer, the liquid solution may freeze, thereby increasing the time and degree of drink temperature control and maintenance.

As shown by FIGS. 2A through 2E, between the inner wall portion 108 and outer wall portion 110, and between the top end portion 116 and bottom end portion 118, there may be defined an inner cavity 142. The top end portion 116, bottom end portion 118, inner wall portion 108, and outer wall portion 110, define a top boundary, bottom boundary, inner boundary, and outer boundary of the inner cavity 142, respectively. The boundaries enclose the inner cavity 142. The inner cavity 142 may contain and carry air or gasses. The inner cavity 142 may include an evacuated chamber. The evacuated chamber in the inner cavity 142 may have a pressure less than 600 Torr, less than $10^{-1}$ Torr, less than $10^{-2}$ Torr, less than $10^{-3}$ Torr, or less than $10^{-4}$ Torr. The inner cavity 142 may contain and carry solids, such as Styrofoam or plastic-coated wood. The inner cavity 142 may contain and carry a liquid solution such that the inner cavity 142 is partially or fully filled. The liquid solution may include water, gel such as alcohol gel, a solute, or a combination thereof. A liquid solution in the inner cavity 142 may have a freezing point, for example, above the temperature of household freezers. The inner cavity 142 may allow for longer temperature retention of the receptacle, thereby increasing the time the temperature of a drink is controlled. The inner cavity 142 may include an expansion area, allowing room for a solution to expand, such that a frozen solution does not exert sufficient pressure on the boundaries of the inner cavity 142 so as to damage the receptacle. Although an inner cavity 142 is shown in FIGS. 2A through 2E, the system may include a receptacle or receptacles without an inner cavity 142. Although only part of the system is shown in FIGS. 2A through 2E, the inner cavity may extend around the receptacle to encompass a drinking vessel or may be housed in a portion or portions of the receptacle.

Figure 3A:
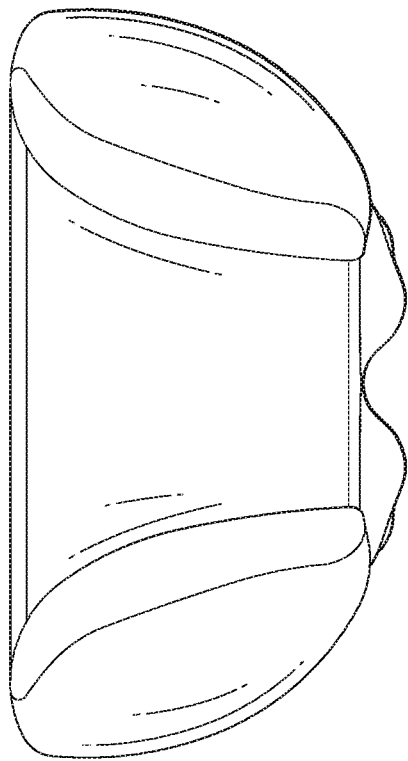
FIG. 3A is a schematic diagram of a receptacle with a first shape defining a recess with a first shape.
Figure 3B:
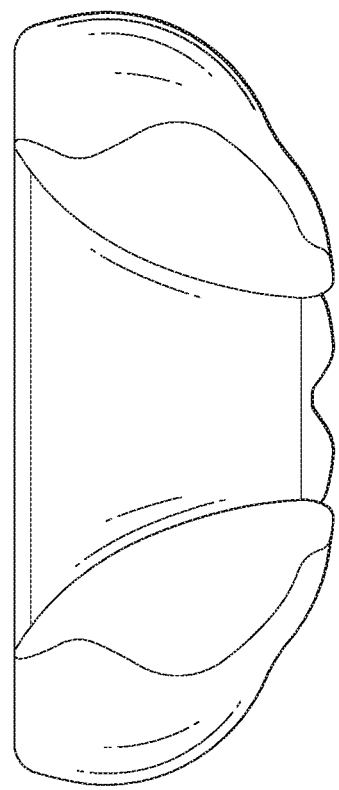
FIG. 3B is a schematic diagram of a receptacle with a second shape defining a recess with a second shape.
Figure 3C:
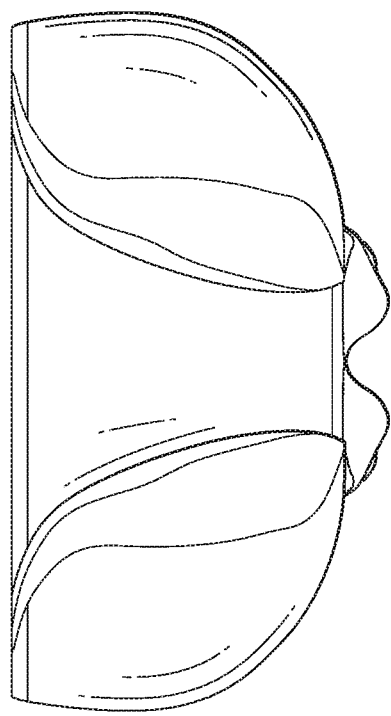
FIG. 3C is a schematic diagram of a receptacle with a third shape defining a recess with a third shape.
Figure 3D:
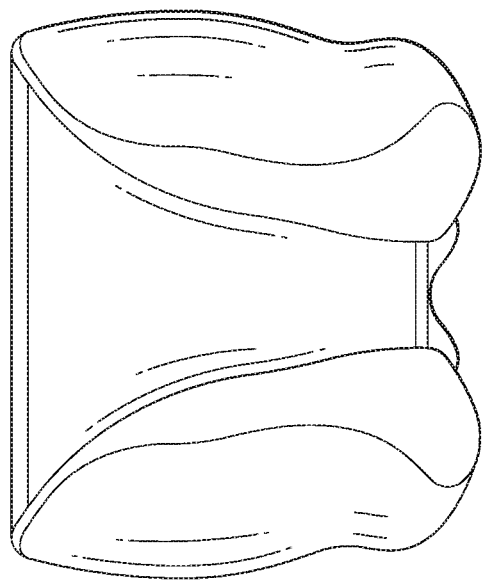
FIG. 3D is a schematic diagram of a receptacle with a fourth shape defining a recess with a fourth shape.
Figure 3E:
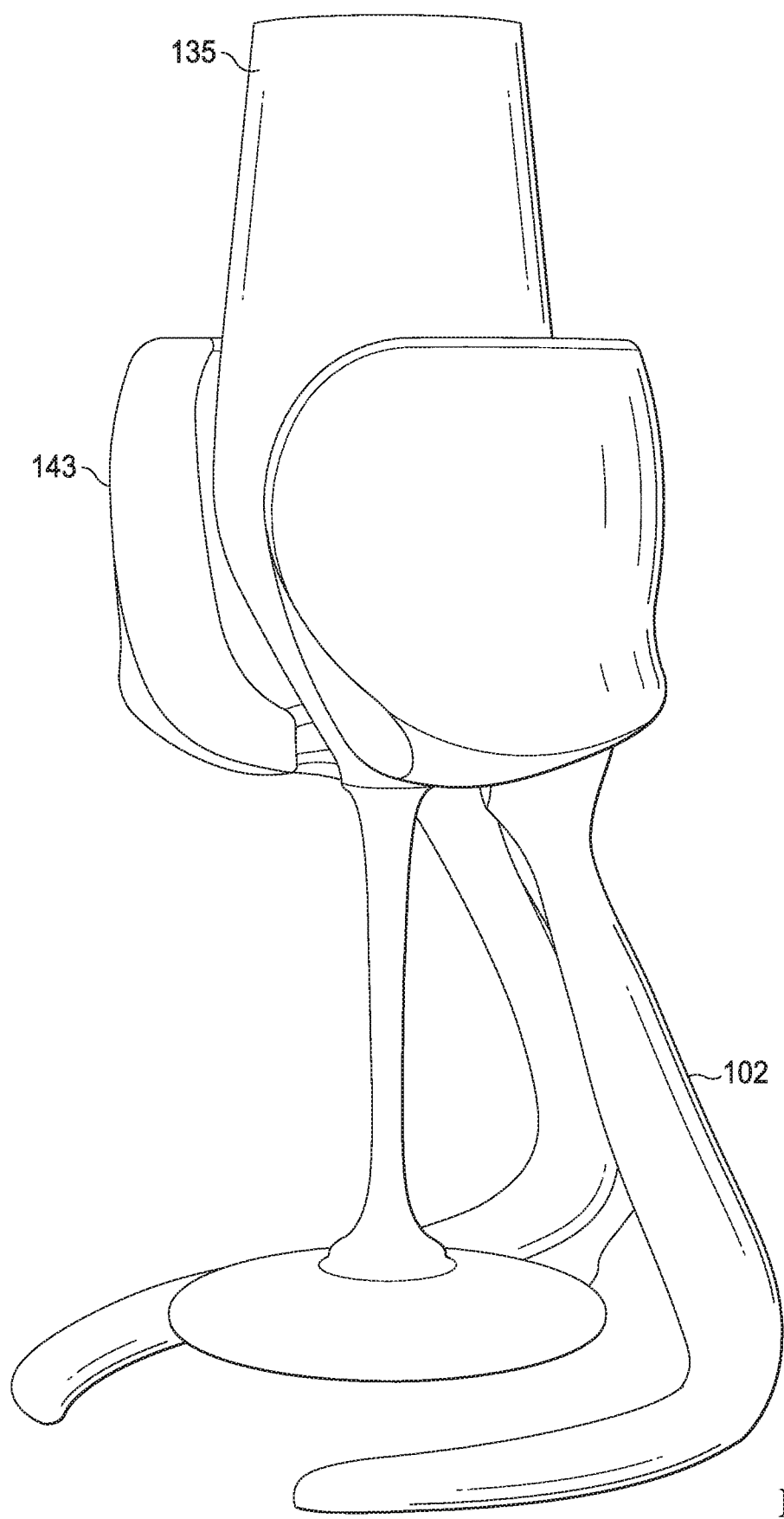
FIG. 3E is a schematic diagram of a system for controlling the temperature of a drink in use with a champagne flute.

One advantage of the system is that it may use multiple receptacles to hold different-shaped drinking vessels. FIGS. 3A through 3E depict multiple receptacles with different shapes defining recesses with different shapes. Each receptacle may releasably attach to the same stand via common attachment shapes. For example, each receptacle may attach to any one or more stands by mating parts such as a pin and hole, or complimenting shapes, magnets, a hinge, joint, or any other attachment mechanism. All receptacles and stands in a system may share common attachment shapes to allow for modularity and interchangeability. In addition to accommodating multiple different drinking vessels, multiple receptacles allow for one or more receptacles to be heated or cooled while another receptacle is in use. For example, a user may be using one receptacle in a system to chill a drinking vessel while another receptacle is sitting in the user's freezer. Each receptacle may be used with and releasably attached to a variety of stands, for example with each stand shown in other FIGURES in this disclosure. FIG. 3E shows a system with the stand 102 and a receptacle 143. The receptacle 143 is releasably attached to the stand 102 and is holding a champagne flute 135. Although FIGS. 3A through 3E show multiple receptacles with different shapes, the system may include multiple receptacles with the same shape, such as receptacles shown in other FIGURES. A system with multiple receptacles with the same shape is beneficial, for example, because a user can have a cooled receptacle for each additional glass of wine. Further, as mentioned earlier, a receptacle can receive many different types of drinking vessels.

Figure 4A:
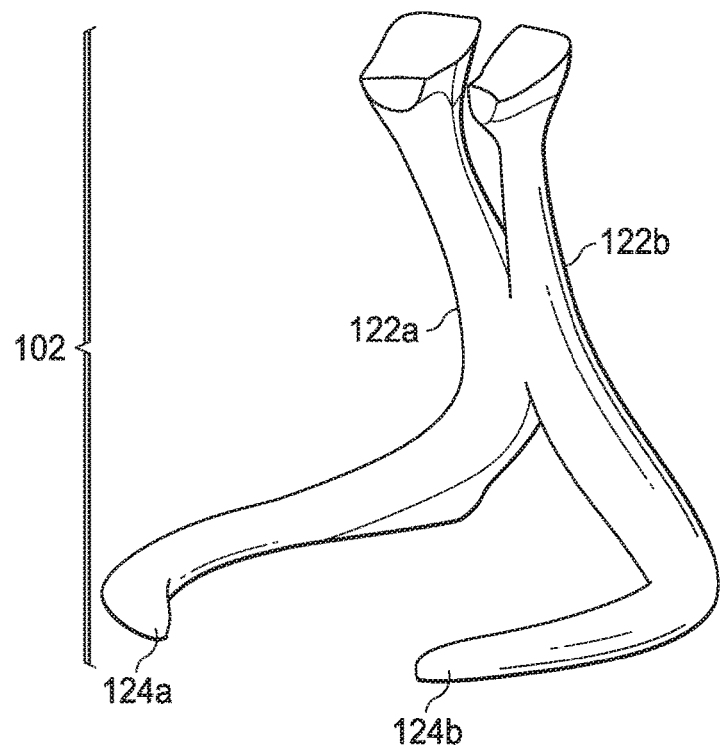
FIG. 4A is a schematic diagram of an elongated stand.
Figure 4B:
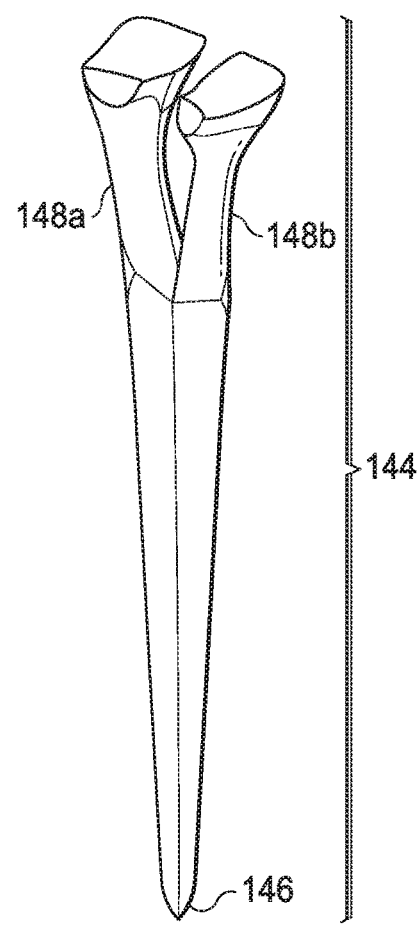
FIG. 4B is a schematic diagram of an elongated stand with a pointed end.
Figure 4C:
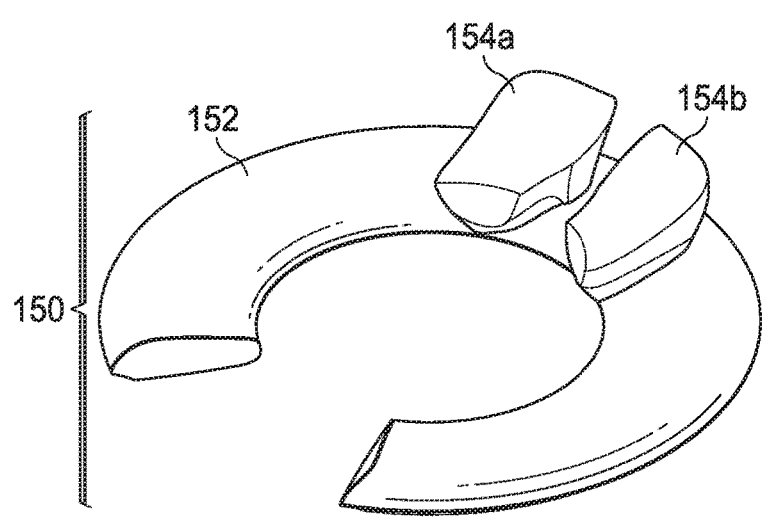
FIG. 4C is a schematic diagram of a stand that is substantially flat.

Another advantage of the system is that it may be used in different settings. For example, the system may have different stands for different uses, such as for use outdoors. FIGS. 4A, 4B, and 4C collectively depict multiple stands in which different receptacles with common attachment shapes may be used. For example, each depicted stand may be used with and releasably attached to receptacles shown in other FIGURES in this disclosure.

An elongated stand may be used to hold above a supporting surface and cool, for example, a stemmed wine glass. FIG. 4A depicts a stand 102, shown in FIGS. 1A through 1C, that may be used with a stemmed wine glass. The stand 102 as shown is elongated. The stand 102 is operable to hold a receptacle upright. The depicted embodiment has two stand prongs 122a and 122b, each with a foot 124a and 124b. The feet 124a and 124b may contact the surface, such as a tabletop or the ground, thereby holding the stand 102 upright.

For use outdoors or for use with a soft, penetrable supporting surface such as earth, a stand may be configured to be inserted into the supporting surface. For example, FIG. 4B depicts a stand 144. The stand 144 as shown is elongated and has a pointed end 146. The pointed end 146 may be inserted securely into a soft supporting surface such as dirt, sand, or grass. The stand 144 may have two stand prongs 148a and 148b. When attached to a receptacle, the stand 144 can thereby hold a receptacle upright above a soft surface. For example, a user may wish to cool a drink while sitting on the ground outdoors.

For use with a drinking vessel without a stem, such as a stemless wine glass, mug, or a whiskey glass, a stand may be configured so as to use minimal space. For example, FIG. 4C depicts a stand 150. The stand 150 as shown is substantially flat. The stand 150 is shown with one foot 152. The stand 150 may hold a receptacle upright. The stand may have two stand prongs 154a and 154b. Although a receptacle may be configured to be substantially flat at a bottom end portion to hold, for example, a stemless wine glass, coffee cup, or snifter, upright without a stand, the stand 150 may be attached to a receptacle to hold a stemless wine glass (or a variety of other drinking vessels). The foot 152 may contact the surface, such as a tabletop or the ground, thereby holding the stand 150 upright.

Different stands, as depicted by example in FIGS. 4A through 4C allow for a system with greater versatility than other systems. The different stands allow for a system that can be used with different drinking vessels and in different environments. A user may wish to use a drinking vessel with a stem, such as a wine glass or a drinking vessel without a stem, such as a whiskey glass. The user may wish to use a drinking vessel while sitting at a table or while sitting on the ground at a picnic.

Figure 5:
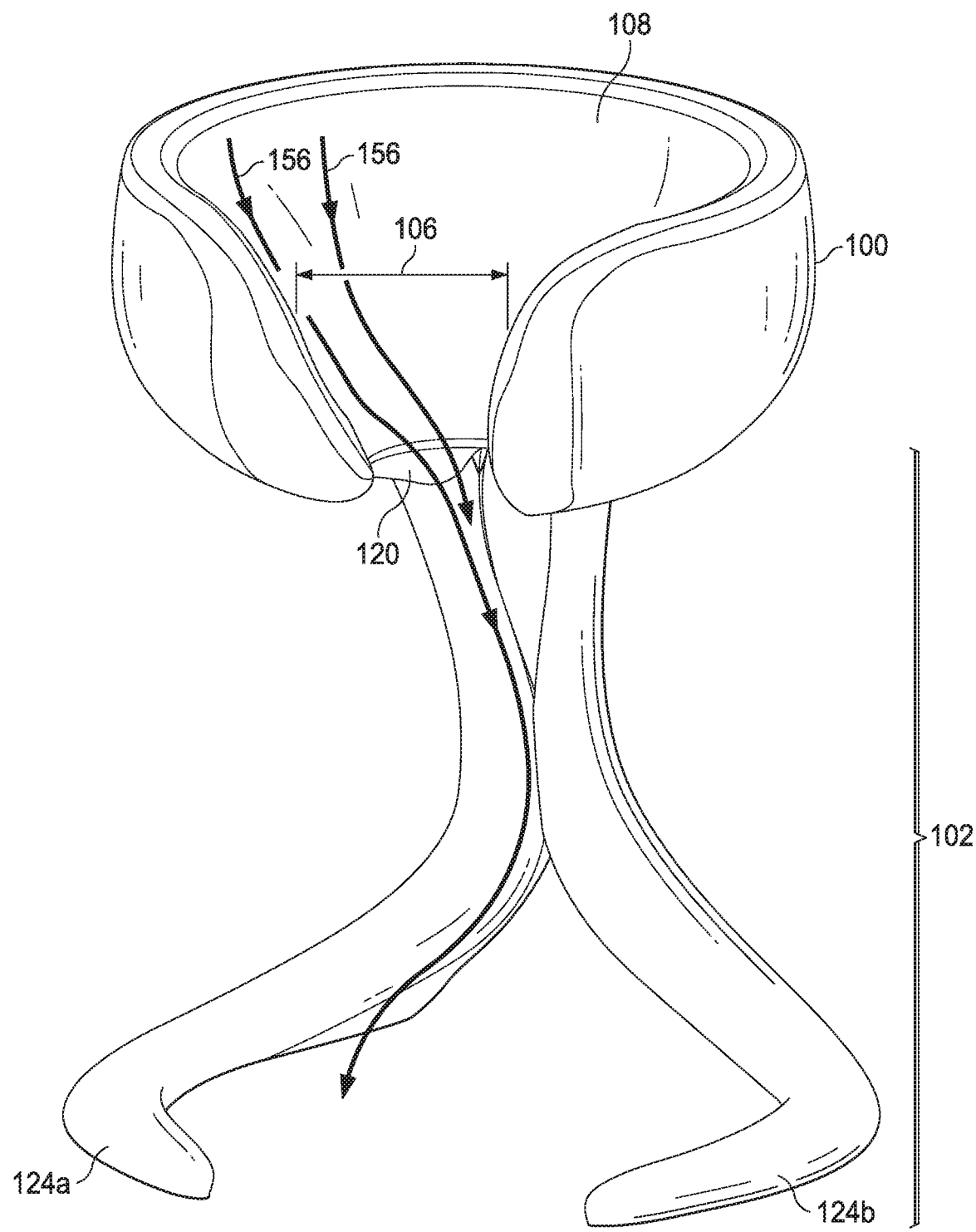
FIG. 5 is a schematic diagram of the system of FIG. 1A, with a highlighted condensation path.

As described above, the system may include a lip to route condensation away from undesired locations. The system may also include a condensation path to route condensation. For example, FIG. 5 depicts the system of FIGS. 1A through 1C with a highlighted condensation path 156. As shown by example in FIG. 5, the condensation path 156 may be formed in part or wholly by contours of the receptacle 100 and stand 102. For example, the inner wall portion 108 is sloped downwardly towards lip 120.

The condensation path 156 allows for moisture that accumulates on the drinking vessel or system to flow to a desired location, such as a foot 124a or 124b, or a location on the receptacle 100. The location on the receptacle 100 for the moisture to flow is away from where the user will grab the drinking vessel at the side opening 106, and away from where the condensation will drip onto a foot of a wine glass, for example. As highlighted in FIG. 5, condensation path 156 extends from the receptacle 100 to the stand 102. The condensation path 156 includes the lip 120. The lip 120 may be shaped to protrude downwardly, as shown in FIG. 5, such that condensation drips off the lip 120, away from the user's hand. In FIG. 5, the condensation path 156 includes the lip 120 and ends at the feet 124a and 124b.

The condensation path 156 may be formed differently. For example, the system may include a condensation path that is formed in part or wholly by a groove on the surface of the inner wall portion 108, stand 102, or both. The condensation path 156 is yet another advantage the system may have, as it prevents unwanted moisture from traveling to undesired locations.

Figure 6:
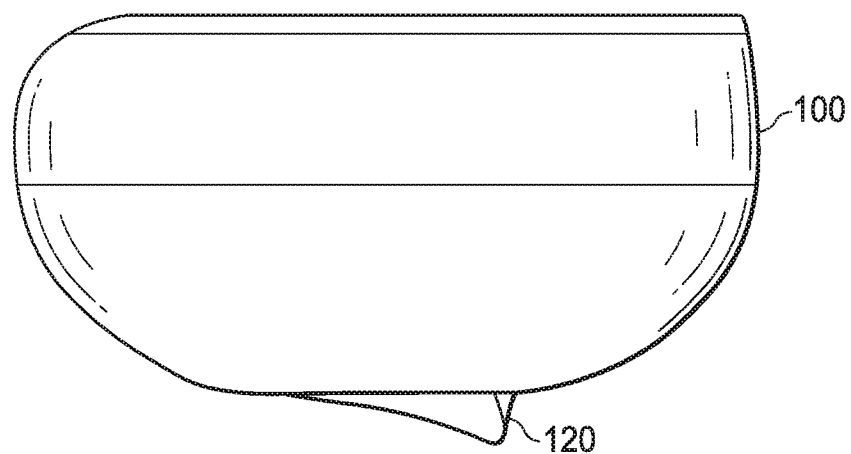
FIG. 6 is a schematic side view of the receptacle of FIG. 1A, with the lip viewable.

As described above, lip 120 offers advantages such as reducing or eliminating moisture contact with a user's hand. To view lip 120, FIG. 6 depicts a side view of receptacle 100 of FIG. 5.

Figures 7A, 7B:
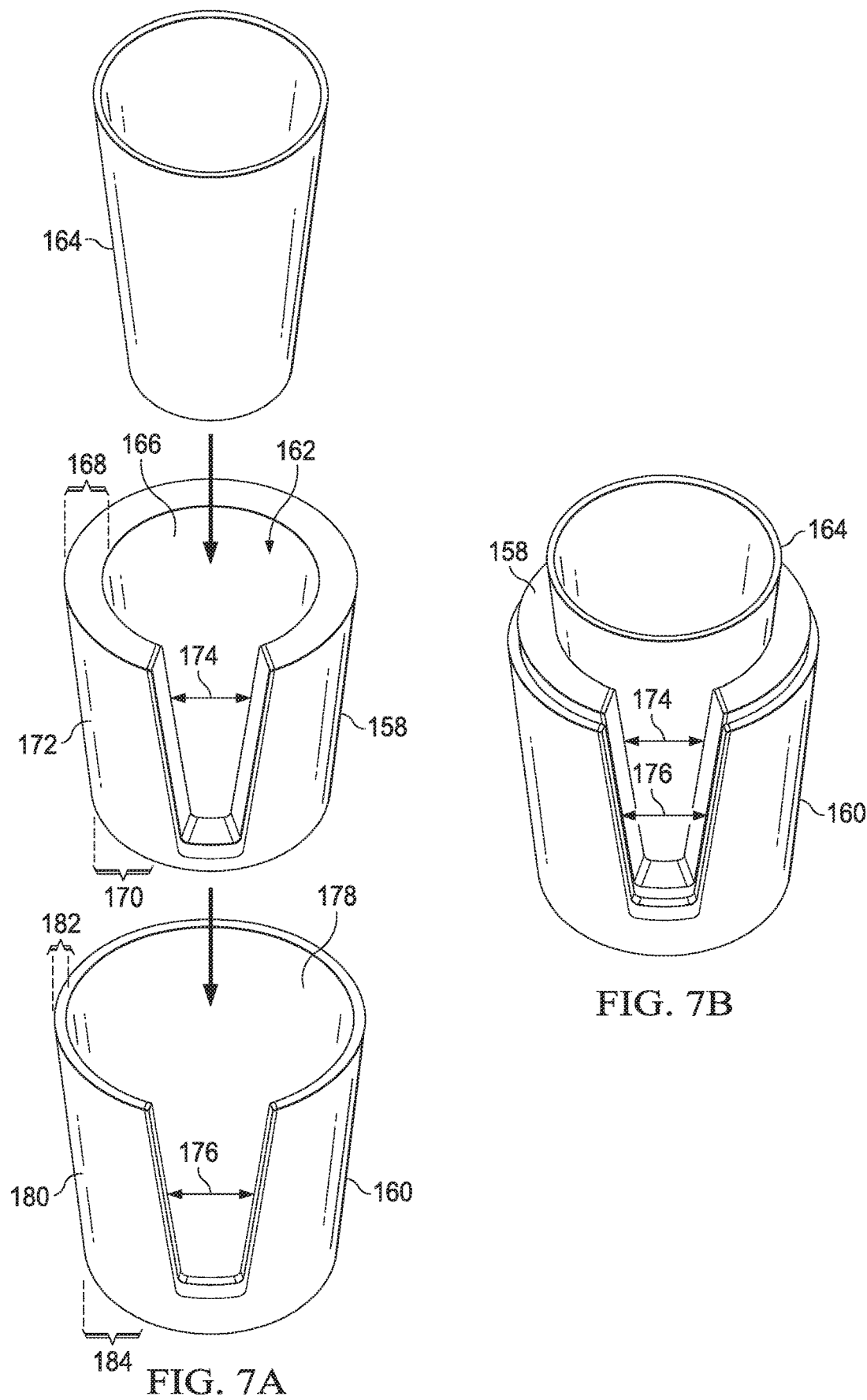
FIG. 7A is a schematic diagram of a system for controlling the temperature of a drink, with a receptacle detached from a stand.
FIG. 7B is a schematic diagram of the system of FIG. 7A with the receptacle releasably attached to the stand.

Another advantage of the system is that it may also be used to efficiently control the temperature of a drink within a drinking vessel such as a pint glass. An additional advantage may allow the pint glass and drink to be viewable while the system controls and maintains the drink temperature. An additional advantage of the system is that the user may fine-tune the temperature to their liking. For example, the user may simply lift their drinking vessel from the receptacle and hold or set the drinking vessel directly on a supporting surface to allow the drink to warm slightly. A stand may also have added functionality to increase insulation and improve the time the drink is maintained at a desired temperature. For example, a stand may have an evacuated chamber to improve insulation. A stand may also be securely and releasably attachable to the receptacle by complimenting the shape of the receptacle, thereby shrouding the receptacle. FIG. 7A depicts an example of the system for controlling the temperature of a drink with a receptacle 158 and a stand 160. The receptacle 158 is shown detached from the stand 160. The receptacle 158 is shaped to define a recess 162 to receive a drinking vessel 164 such as a pint glass. The inner wall portion 166 is sloped inwardly from the top end portion 168 to the bottom end portion 170. The outer wall portion 172 is sloped inwardly from the top end portion 168 to the bottom end portion 170. Since the receptacle 158 compliments the shape of the drinking vessel 164, the receptacle 158 allows for a large surface area of the receptacle 158 to contact the drinking vessel, thereby enabling efficient transfer of thermal energy.

The receptacle 158 shown defines a side opening 174 to allow parts of a drinking vessel 164 to be viewed while the system holds the drinking vessel 164. Alternatively, a receptacle may fully shroud the pint glass. The side opening 174 also allows the drinking vessel 164 to be easily received by the recess 162 by providing the user more space to grab the drinking vessel 164. As depicted in FIG. 7A, the side opening 174 extends laterally from the inner wall portion 166 to the outer wall portion 172. As described above in this disclosure, between the inner wall portion 166 and outer wall portion 172, and between the top end portion 168 and bottom end portion 170, there may be defined an inner cavity.

The stand 160 also defines a stand side opening 176 such that the drinking vessel 164 is viewable when held by the receptacle 158 when the receptacle 158 is releasably attached to the stand 160. The stand 160 includes an evacuated chamber. The evacuated chamber may be contained between a stand inner wall portion 178, a stand outer wall portion 180, a top stand portion 182, and a bottom stand portion 184. The evacuated chamber has a pressure less than 600 Torr, less than $10^{-1}$ Torr, less than $10^{-2}$ Torr, less than $10^{-3}$ Torr, or less than $10^{-4}$ Torr. The evacuated chamber provides for better insulation of the drinking vessel 164 when the receptacle 158 is holding the drinking vessel 164 and is releasably attached to the stand 160. The stand 160 and receptacle 158 also may include an outer texture sleeve to allow for better grip when, for example, the user removes the receptacle 158 from a freezer. The outer texture sleeve may be releasably attachable.

The system as configured for a pint glass or other glasses may include the releasably attachable functionality and modularity. As mentioned above, releasably attachable parts may save space, for example in a freezer, and may add versatility to the system. FIG. 7B depicts the system for controlling the temperature of a drink in FIG. 7A, with the receptacle 158 releasably attached to the stand 160. In the depicted example, the receptacle 158 and stand 160 releasably attach by being complimentarily shaped, such that the receptacle 158 fits tightly within the stand 160. As shown by FIG. 7B, the stand 160 shrouds the receptacle 158 and may thereby improve insulation and increase the time of temperature control. Also as shown by FIG. 7B, the drinking vessel 164 viewable due to the side opening 174 and stand side opening 176.

FIGS. 7A and 7B use a pint glass as an example. The receptacle 158 and stand 160 depicted in FIGS. 7A and 7B may be complimentarily shaped to releasably attach and fit any drinking vessel. To provide longer temperature control and maintenance, the system may have a receptacle without a side opening and a stand without a stand side opening.

Figure 8A:
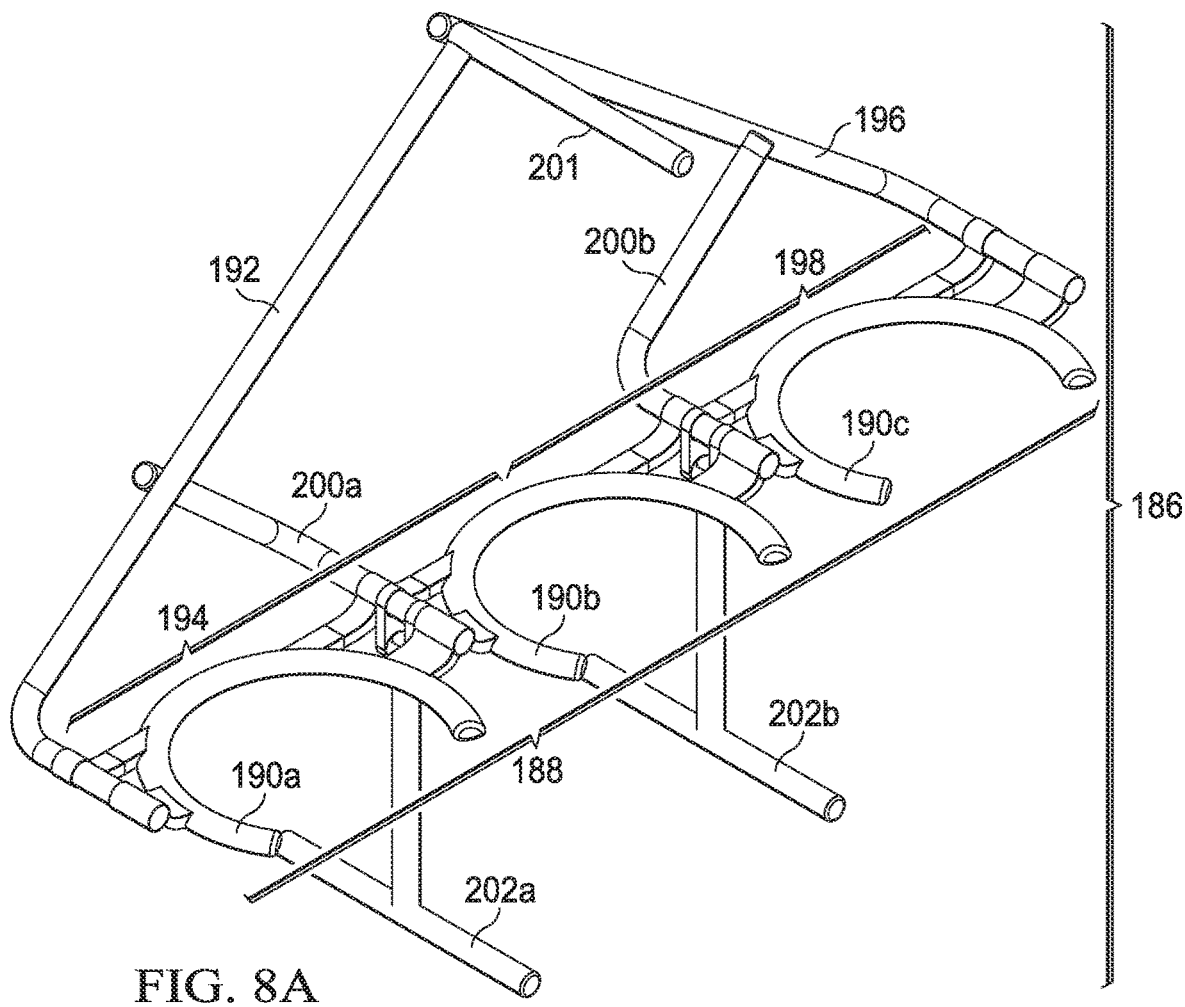
FIG. 8A is a schematic diagram of a rack.

The system offers further advantages over previous systems in that it may include a rack to allow for easy carrying. Other systems may be bulky and therefore difficult to carry and store. FIG. 8A depicts a portion of an exemplary system, a rack 186. The rack 186 has a tray 188 that is used to carry one or more receptacles releasably attached to stands, one or more drinking vessels, or a combination thereof. The tray 188 has a hand 190a, a hand 190b, and a hand 190c, each for receiving a receptacle releasably attached to a stand, a drinking vessel, or a combination thereof. Each hand 190a, 190b, and 190c is substantially C-shaped, as shown in FIG. 8A. Alternatively, hands may be shaped as two straight lines, for example. The hands 190a, 190b, and 190c fit under a receptacle, drinking vessel, or both to lift the receptacle, drinking vessel, or both when a user exerts an upward force on the hands 190a, 190b, and 190c. The rack 186 may include any number of hands to carry any number of one or more receptacles releasably attached to stands, one or more drinking vessels, or a combination thereof.

The rack 186 has a first arm 192 attached to a first tray side 194. The first arm 192 may be attached to the first tray side 194 by a hinge, joint, mating parts such as a pin and hole, or complimenting shapes, magnets, or any other attachment mechanism. The rack 186 has a second arm 196 attached to the second tray side 198. The second arm 196 may be attached to the second tray side 198 by a hinge, joint, mating parts such as a pin and hole, or complimenting shapes, magnets, or any other attachment mechanism. The first arm 192 and the second arm 196 are attached such that the first arm 192 and the second arm 196 may fold, as described later. The first arm 192 and the second arm 196 have movable secondary arms 200a and 200b further attaching the first arm 192 and second arm 196, respectively, to the tray 188. The rack 186 may also have two rack feet 202a and 202b to stand the rack 186 upright on a supporting surface. The rack feet 202a and 202b are attached to the tray 188 and are foldable under the tray 188. The rack feet 202a and 202b may be attached to the tray 188 by a hinge, joint, mating parts such as a pin and hole, or complimenting shapes, magnets, or any other attachment mechanism. The rack 186 includes a rack handle 201 to allow the user to more easily carry the rack 186.

Figure 8B:
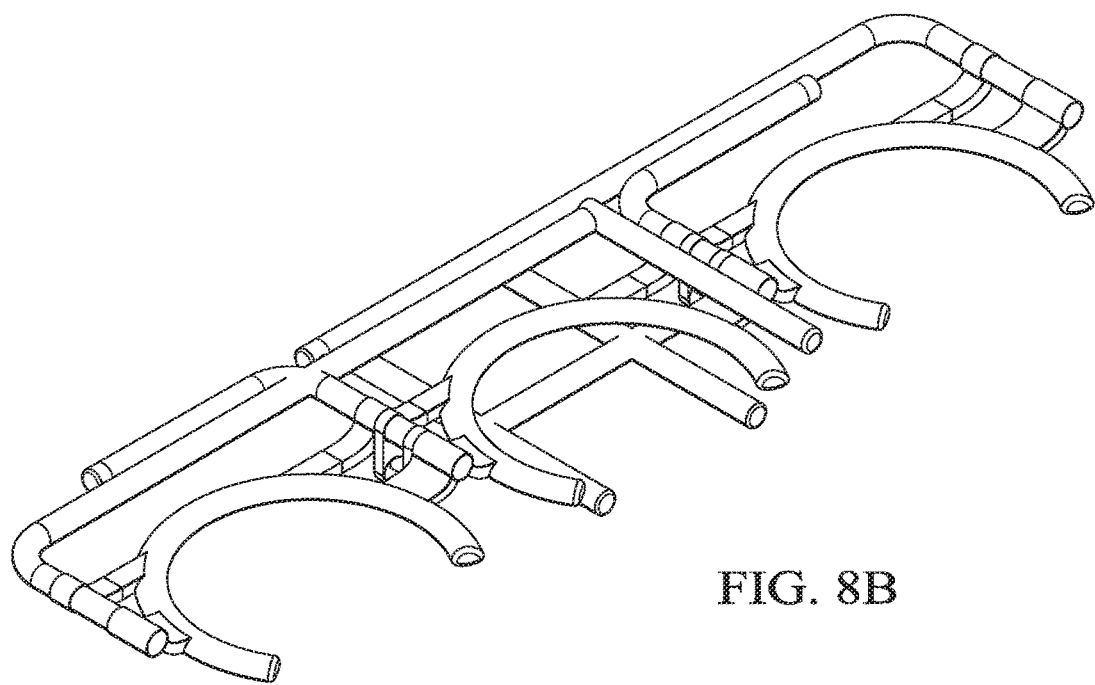
FIG. 8B is a schematic diagram of the rack of FIG. 8A in a folded position.
Figure 8C:
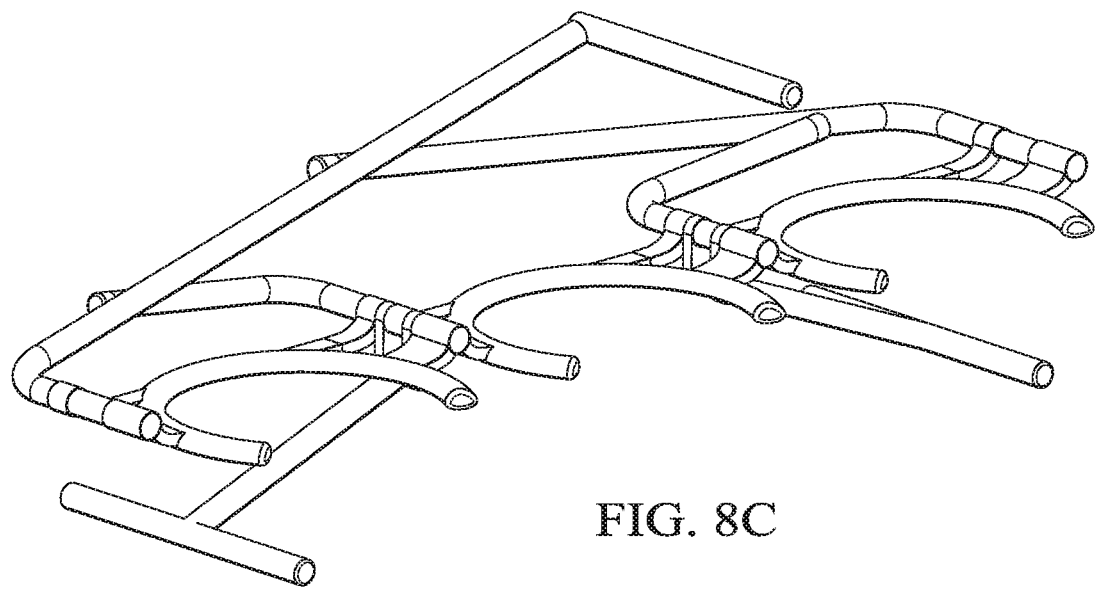
FIG. 8C is a schematic diagram of the rack of FIG. 8A in a partially folded position.

Storage spaces can be limited in settings where one or more drinking vessels, receptacles, stands, or a combination thereof are used. For example, a restaurant or bar may need numerous receptacles and drinking vessels and may need a rack to carry the receptacles to tables. But the restaurant may have limited storage space. Therefore, a rack that can carry the system but can be stored in a small amount of space is desired. The rack 186 can further save space for the user by being foldable when not being used for carrying. For example, FIG. 8B depicts the rack 186 of FIG. 8A in a folded position. FIG. 8C depicts the rack 186 of FIG. 8A in a partially folded position.

Figure 9:
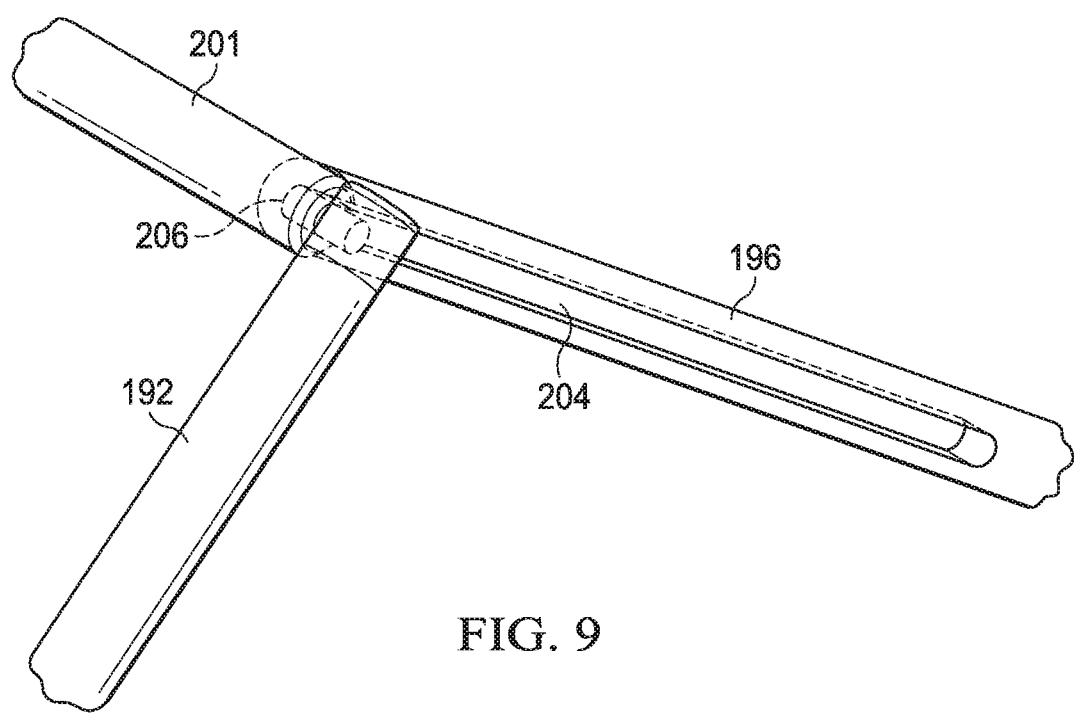
FIG. 9 is a schematic partial rear view of the rack of FIG. 8A.

In one example of how the rack 186 in FIGS. 8A through 8C can fold to save space, FIG. 9 depicts how the first arm 192 and second arm 196 may fold. FIG. 9 shows a partial rear view of the rack depicted in FIGS. 8A through 8C. The second arm 196 may have a track 204 that allows a wheel 206 of the first arm 192 to slide in the track 204, thereby folding the rack. The wheel 206 need not rotate to slide in the track 204. Wheel 206 is a cylindrical pin. A wheel may revolve around an axle, may have a low-friction surface, or both.

Figure 10:
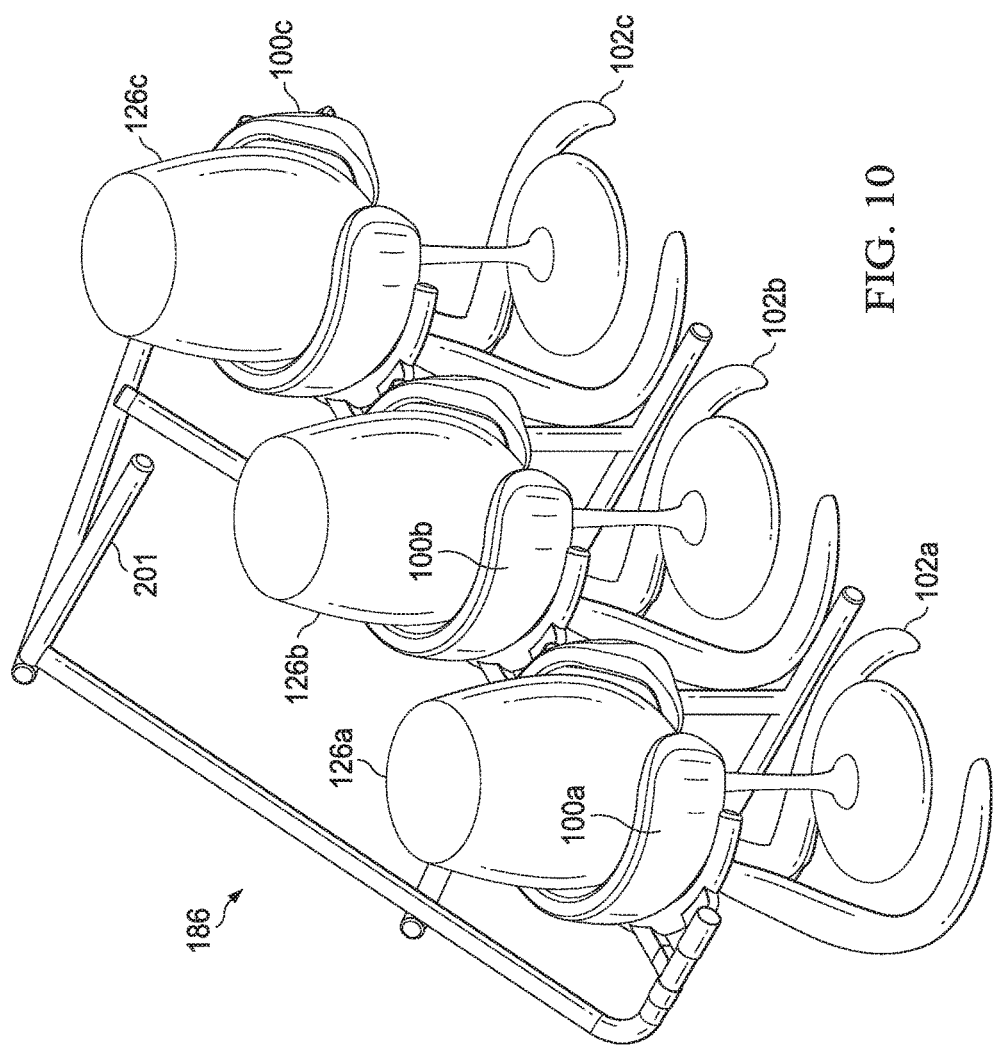
FIG. 10 is a schematic diagram of a system with the rack of FIG. 8A carrying three receptacles, stands, and drinking vessels.

FIG. 10 depicts a system with the rack 186 of FIG. 8C. The system is shown with rack 186 carrying three receptacles 100a, 100b, and 100c releasably attached to three stands 102a, 102b, and 102c. Each receptacle 100a, 100b, and 100c is shown holding a drinking vessel 126a, 126b, or 126c. The system is modular, as any of the three receptacles 100a, 100b, and 100c may be releasably attached to any of the three stands 102a, 102b, or 102c. When a user lifts the rack, for example by the rack handle 201, the user may lift and carry the system.

Figure 11A:
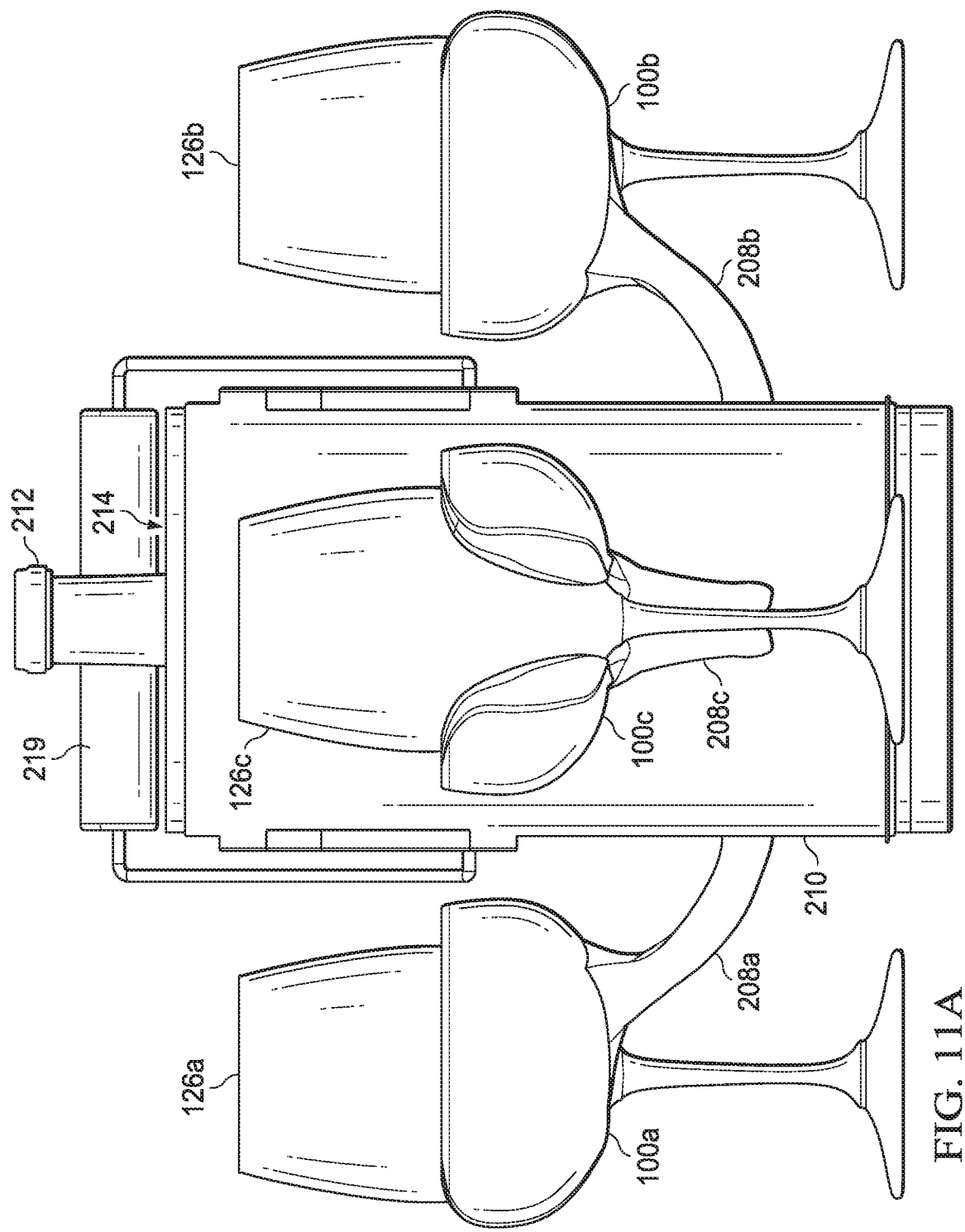
FIG. 11A is a schematic diagram of a system for controlling the temperature of a drink with a canister.

In an exemplary system, the system includes a canister to hold a wine bottle and multiple stands for attaching receptacles. Users may wish to maintain the temperature of a bottle while viewing it or sharing it at a restaurant. The canister may be configured to receive any type of bottle or drinking vessel. The system can simultaneously control and maintain the temperature of wine within a wine bottle and wine poured into wine glasses. Users may also wish to easily carry one or more receptacles, stands, drinking vessels, bottles, or a combination thereof. FIG. 11A depicts an exemplary system that allows for easy carrying and simultaneous temperature control of drinking vessels and a bottle. Each receptacle 100a, 100b, and 100c is shown releasably attached to stands 208a, 208b, and 208c, respectively. The stands 208a, 208b, and 208c are mounted on a canister 210. The canister 210 has a fourth stand mounted on a rear side of the canister, not viewable in FIG. 11A. The stands 208a, 208b, and 208c may alternatively be releasably attached to the canister 210. The canister 210 is operable to receive a wine bottle 212 with a canister recess 214 defined by the canister 210.

To maintain and control the temperature of the wine bottle 212, the canister 210 may be thermally insulated so as to prevent thermal energy from traveling into the canister recess 214. For example, the canister 210 may include a canister inner cavity. The canister inner cavity may include an evacuated chamber. The evacuated chamber in the canister inner cavity may have a pressure less than 600 Torr, less than $10^{-1}$ Torr, less than $10^{-2}$ Torr, less than $10^{-3}$ Torr, or less than $10^{-4}$ Torr. To maintain and control the temperature of the wine bottle 212, for example, the canister inner cavity may be filled with thermal material including a solid, gas, liquid, or combination thereof. The canister inner cavity or canister recess 214 may be filled with ice to control and maintain the temperature of the wine. The user may place the canister 210 in a cooling or heating environment before use.

The canister 210 may include a removable inner sleeve. The removable inner sleeve may function so that the user can store only the removable inner sleeve in a heating or cooling environment so as to save space in the heating or cooling environment. The removable inner sleeve may be part of or include any part of the canister 210. For example, the inner sleeve may include the inner cavity and evacuated chamber.

One advantage of the system of FIG. 11A is that it allows a user to simultaneously control the temperature of wine within a wine bottle and wine within drinking vessels held by the receptacles 100a, 100b, and 100c. Since the receptacles 100a, 100b, and 100c are releasably attachable to the stands 208a, 208b, and 208c mounted on the canister 210, receptacles that have been warmed over time may be swapped for cool receptacles. The system therefore allows the temperature of drink to be controlled and maintained for extended periods of time. Additionally, the system may be used with receptacles with different shapes to accommodate different drinking vessels. The system can therefore be used when, for example, users wish to enjoy wine of a first type using a first type of glass, then switch to a second type of wine using a second type of glass. A system with a canister may be configured to use any number of receptacles and stands. The system may be used with stands with different lengths or extendable stands for differently sized tables. The system may have more or less stands and receptacles. A canister may be shaped to receive multiple bottles.

Figure 11B:
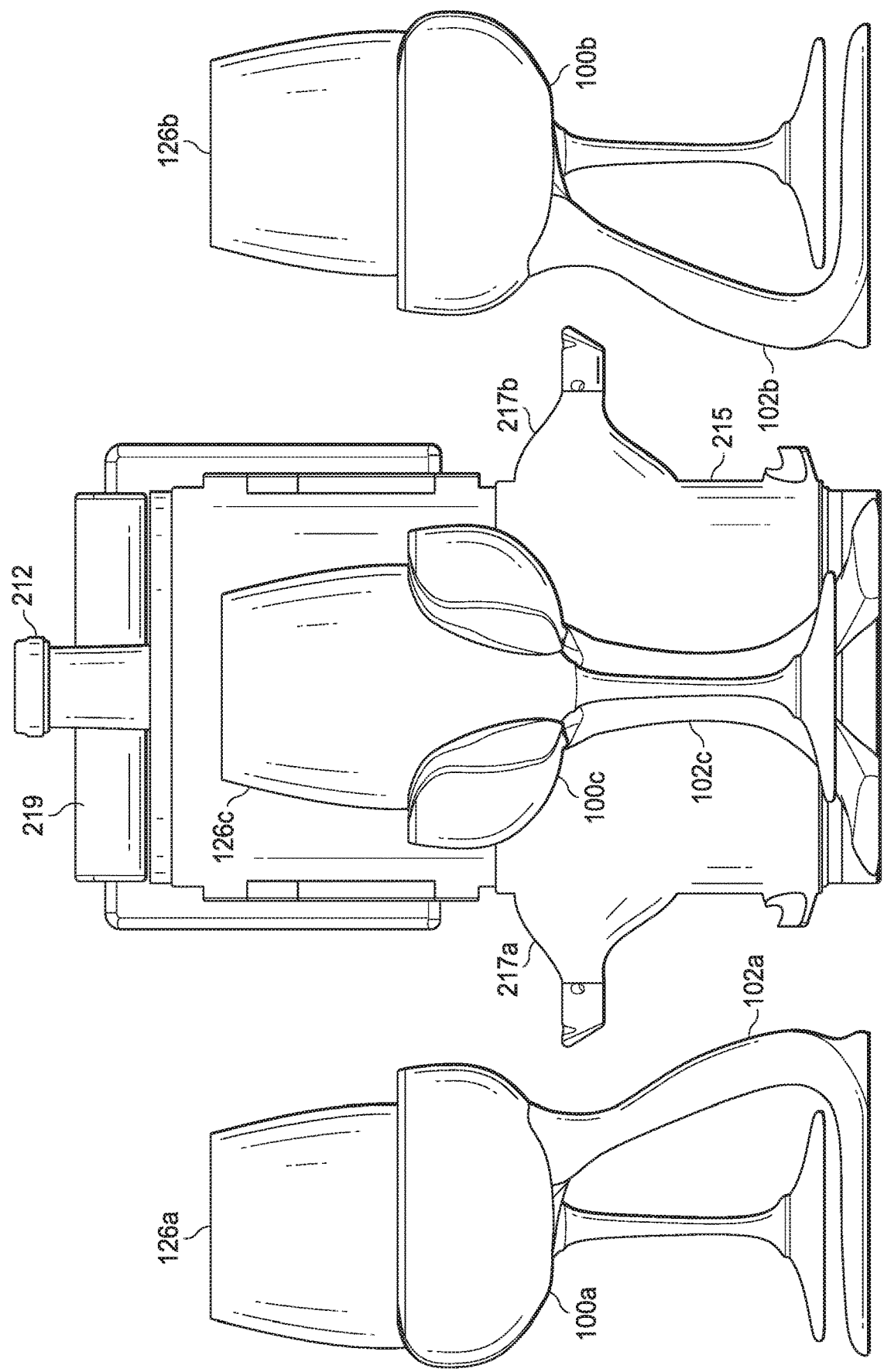
FIG. 11B is a schematic diagram of a system for controlling the temperature of a drink with a canister with canister arms.
Figure 11C:
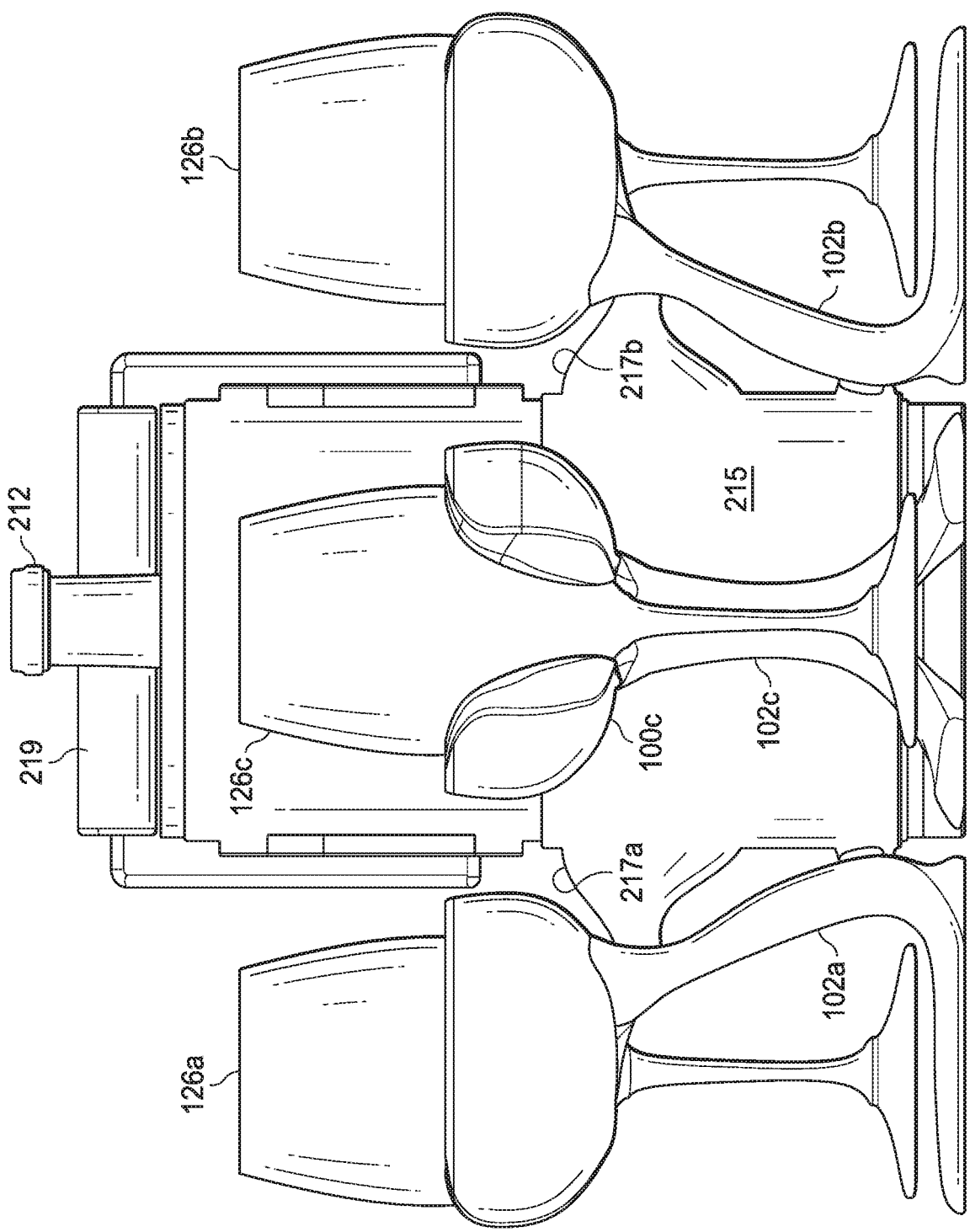
FIG. 11C is a schematic diagram of the system of FIG. 11B, with the canister arms shows holding receptacles.

Users may wish to enjoy the benefits of a canister, such as easy carrying and simultaneous temperature-control of a bottle, while also enjoying the mobility of a freestanding receptacle and stand. Each pair of freestanding receptacles and stands may be independently moved by each user, while still holding a drinking vessel, thereby temperature-controlling a drinking vessel and allowing each user to place their drinking vessel at a reachable location. Such mobility may be desired at a large table, where it may be difficult for all users to reach one location. FIG. 11B is an exemplary system with a canister 215 having freestanding receptacles 100a, 100b, and 100c, stands 102a, 102b, and 102c and drinking vessels 126a, 126b, and 126c. The receptacles 100a, 100b, and 100c are releasably attached to the stands 102a, 102b, and 102c, respectively. To securely hold receptacles and stands, canister arms 217a and 217b are mounted on the canister 215. Additional canister arms are mounted on the front and rear of the canister 215 but are not viewable at the angle shown in FIG. 11B. The canister arms 217a and 217b fit under receptacles 100a and 100b and the stands 102a and 102b. The canister arms 217a and 217b may be shaped to fit securely around the stand and receptacle to hold the receptacle and stand, while not intruding on the recess or preventing the receptacles 100a and 100b from holding the drinking vessels 126a and 126b. A canister handle 219 is attached to the canister 210. While the canister arms 217a and 217b securely hold the receptacles 100a and 100b, a user may lift the canister, or canister handle 219, thereby lifting the receptacles 100a and 100b, the stands 102a and 102b, releasably attached to the receptacles, and the drinking vessels 126a and 126b held by the receptacles 100a and 100b. The system therefore allows a user to carry multiple receptacles, stands, drinking vessels, and a bottle. The system may include canister arms that releasably attach to stands or receptacles to securely hold the stands and receptacles. Canister arms may attach to stands by mating parts such as a pin and hole, magnets, a hinge, joint, or any other attachment mechanism. FIG. 11B shows the system while the canister arms 217a and 217b are not holding the stands 102a and 102b and receptacles 100a and 100b. FIG. 11C shows the system of FIG. 11B, while the canister arms 217a and 217b are holding the stands 102a and 102b and receptacles 100a and 100b. Stand 102c and receptacle 100c are being held by a canister arm that is not viewable. By lifting the canister handle 219, the user may carry the system and drinking vessels 126a, 126b, and 126c held by the system.

Drinks are often enjoyed out of stemless drinking vessels such as whiskey glasses or stemless wine glasses. Like drinks poured into stemmed drinking vessels, drinks poured into stemless drinking vessels are often poured such that the entire drinking vessel is not fully filled. For example, wine and whiskey are commonly poured to fill less than the entire drinking vessel or less than two-thirds, less than half, or less than a third of the drinking vessel. Filling less than the entire drinking vessel allows a user to swirl the drink in the glass, so that the user may better smell the complex aromas of the drink. Additionally, filling the drinking vessel with less drinking fluid exposes the drink to more oxygen and may thereby develop the flavor of the drink. In an exemplary system, the system may be used to hold stemless drinking vessels and contact a bottom portion of the drinking vessel to allow for efficient temperature control and maintenance, while still enabling viewing of the drinking vessel, the drink within, or both. The system may include a receptacle that shrouds a bottom portion of the drinking vessel where some, most, or all of the drink is likely to be contained. The system may also shroud most or all of the drinking vessel. FIG. 12A depicts an exemplary system, with the receptacle 216 defining a recess 218 and holding drinking vessel 220. Drinking vessel 220 is a stemless wine glass. The receptacle 216 is shown shrouding and contacting a bottom portion of the drinking vessel 220 where the drink is most likely to be contained. The system still allows the drinking vessel 220 to be viewed, or additionally allows a portion or all of the drink contained within to be viewed, thereby enhancing the user's enjoyment of the drink. The greater area of contact with the bottom portion of the drinking vessel 220 where the drink is contained allows for better thermal conduction and thereby better temperature control and maintenance. The receptacle 216 has a top end portion 222, a bottom end portion 224, an inner wall portion 226, and an outer wall portion 228. The top end portion 222 is shown defining a top opening 230 of the recess 218. The receptacle 216 is shown standing upright without a stand. The receptacle 216 includes a bottom opening 221. The bottom opening 221 allows condensation to drip through the opening instead of pooling in the bottom of the receptacle 216.

The receptacle 216 may hold many differently shaped drinking vessels. The system may include any other feature. For example, the system may include an inner cavity, a multivessel contour, both, or additionally or alternatively any one or more of other features as described elsewhere in this disclosure. A receptacle, while shown without a side opening in FIG. 12A, may include a side opening. The receptacle 216 may also releasably attach to a stand.

FIG. 12B depicts the system and drinking vessel 220 of FIG. 12A, when the receptacle 216 is not holding the drinking vessel 220. The inner wall portion 226, recess 218, and top opening 230 are viewable.

Figure 13:
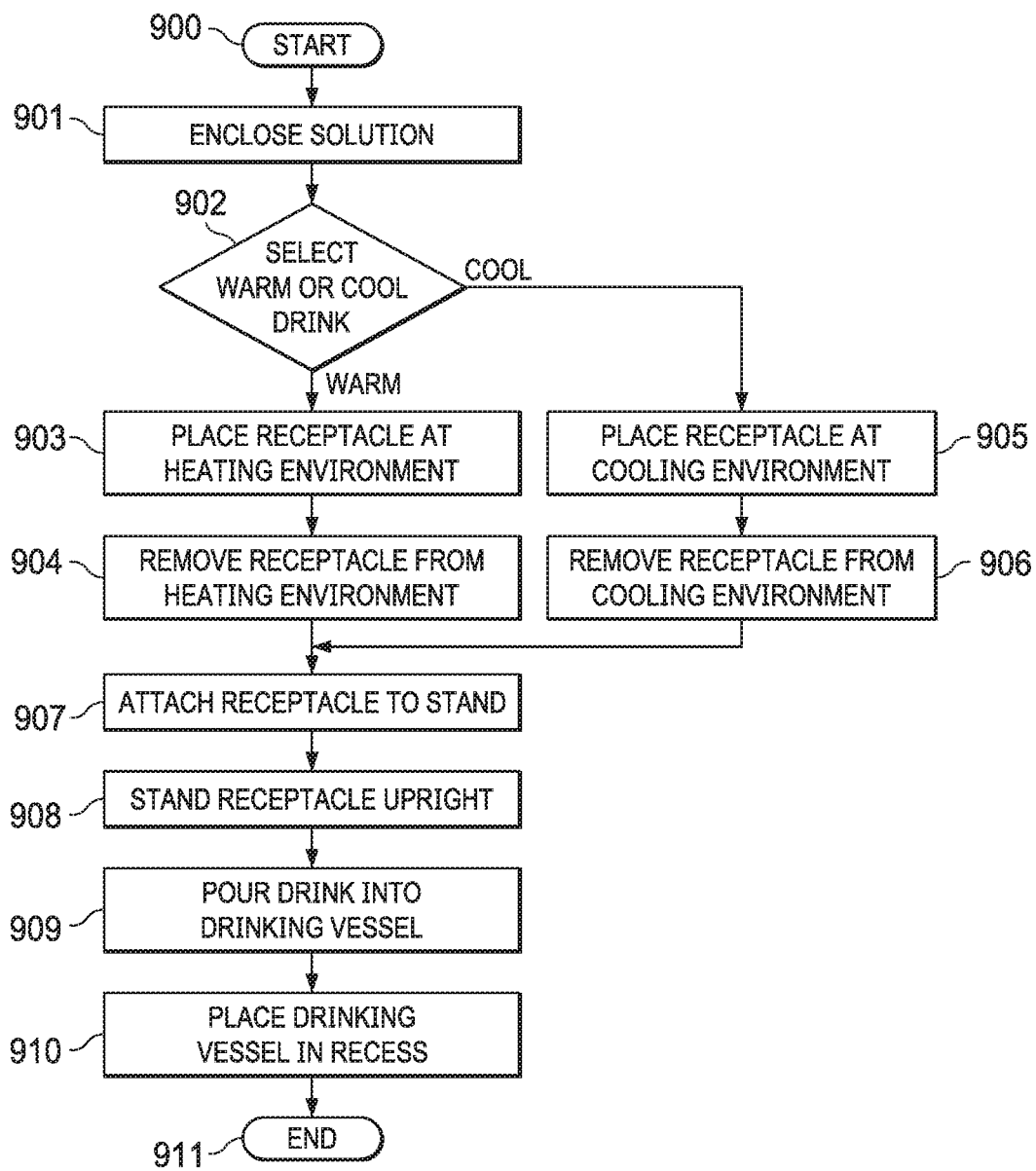
FIG. 13 is a flow chart of a method for controlling the temperature of a drink.

Disclosed herein are methods to control a temperature of a drink. The methods allow for better enjoyment of the drink by the user by enabling viewing of the drink, saving space, and efficiently controlling the drink's temperature. FIG. 13 is a flow chart of an exemplary method for controlling the temperature of a drink. The method may use components and systems as described elsewhere in this disclosure. For example, the method may use the receptacle, stand, receptacle and stand, or system as described with respect to FIGS. 1A through 12B. After starting the controlling of the temperature at step 900, the method includes enclosing a liquid solution in an inner cavity of a receptacle at step 901. Enclosing a solution allows for better and longer thermal transfer. The method includes selecting whether a warm or cool drink is desired at step 902. If a warm drink is selected, the method includes placing a receptacle at a heating environment at step 903. The heating environment may be any environment where the temperature is above room temperature, such as an oven, microwave, or heat lamp. The method includes removing the receptacle from the heating environment at step 904. If a cool drink is selected, the method includes placing a receptacle at a cooling environment at step 905. The cooling environment may be any environment where the temperature is below room temperature, such as a freezer or refrigerator. The method includes removing the receptacle from the cooling environment at step 906.

The method includes attaching the receptacle to a stand at step 907. The method includes standing the receptacle upright at step 908. The receptacle may be stood at step 908 by placing a stand releasably attached to the receptacle on a surface. The receptacle may be stood at step 908 by standing the receptacle upright without a stand on a supporting surface such as a tabletop or the ground outdoors. The receptacle may be stood at step 908 by inserting into the earth a stand with a pointed end releasably attached to the receptacle. The method includes pouring a drink into a drinking vessel at step 909. The method includes placing the drinking vessel into a recess defined by the receptacle at step 910. The method may additionally include fine-tuning the temperature of the drink. For example, the method may include lifting the drinking vessel from the recess defined by the receptacle so as to let the drink warm or cool slightly. The method includes ending the controlling of the temperature at step 911.

Figure 14A:
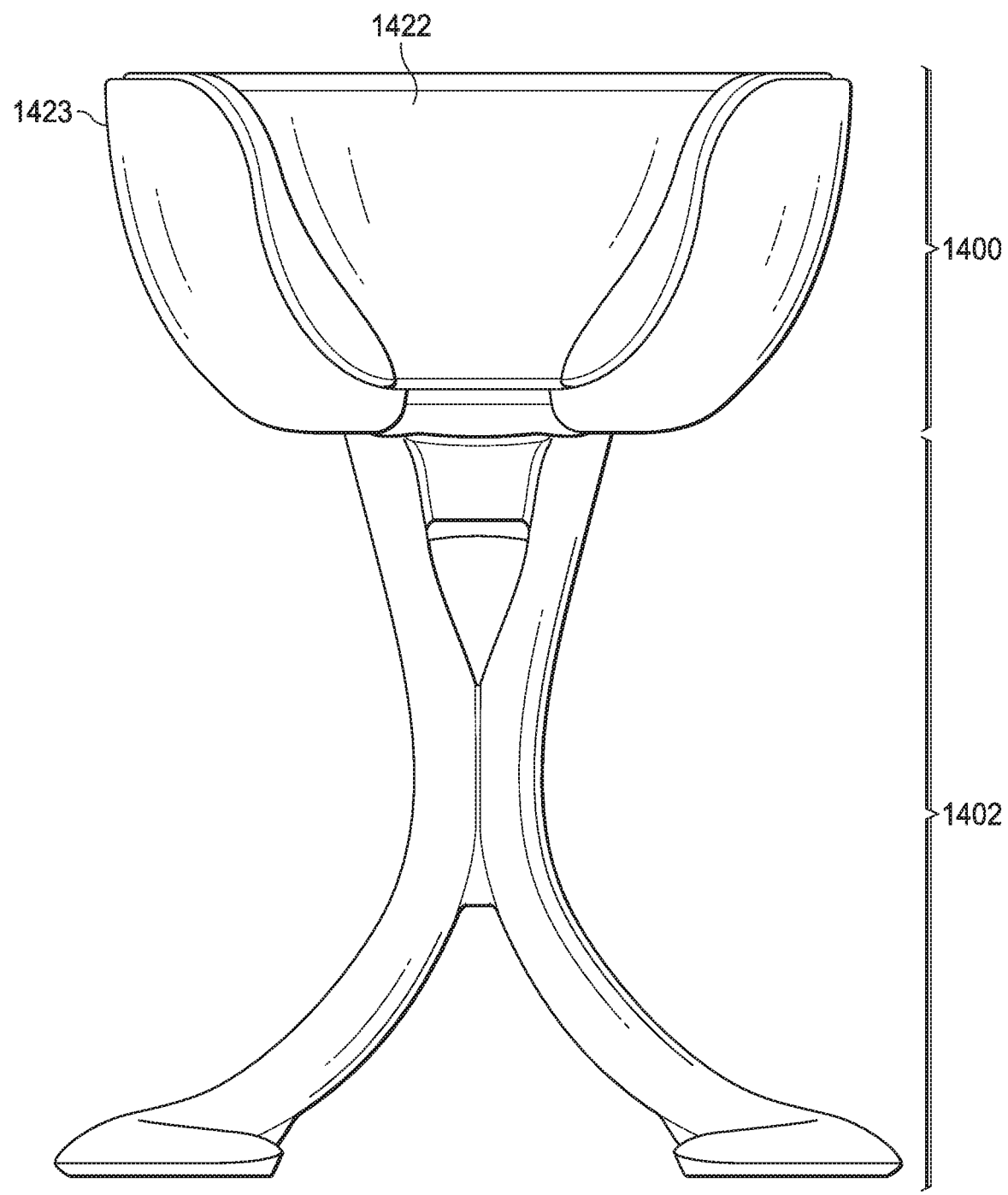
FIG. 14A is a schematic diagram of a front view of a further implementation of the system for controlling the temperature of a drink, the system including a receptacle system releasably attached to a stand.
Figure 14B:
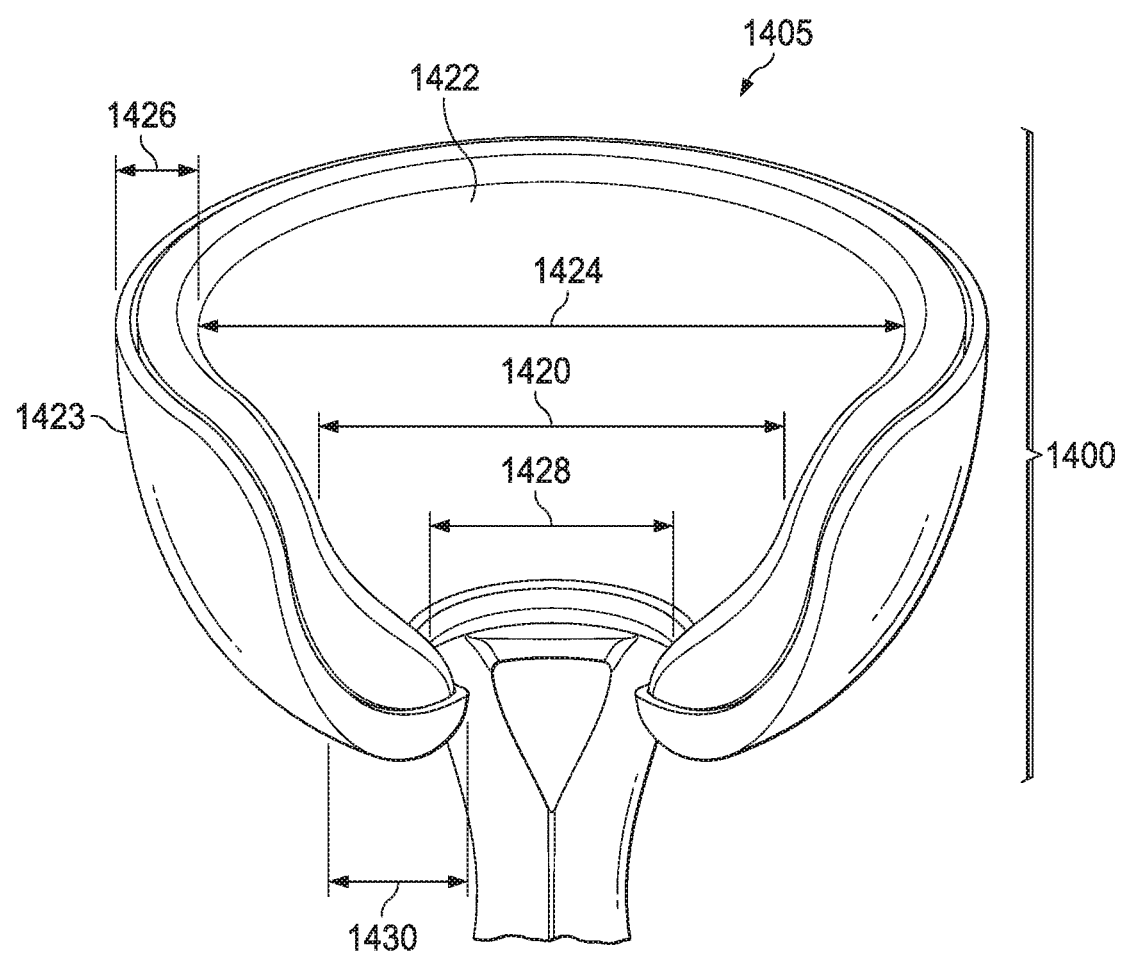
FIG. 14B is a schematic perspective view of the receptacle system of FIG. 14A.

FIGS. 14A, 14B illustrates a further implementation of the receptacle, shown as receptacle system 1400, and the stand, shown as stand 1402. The receptacle system 1400 can be releasably attached to the stand 1402.

Figure 15:
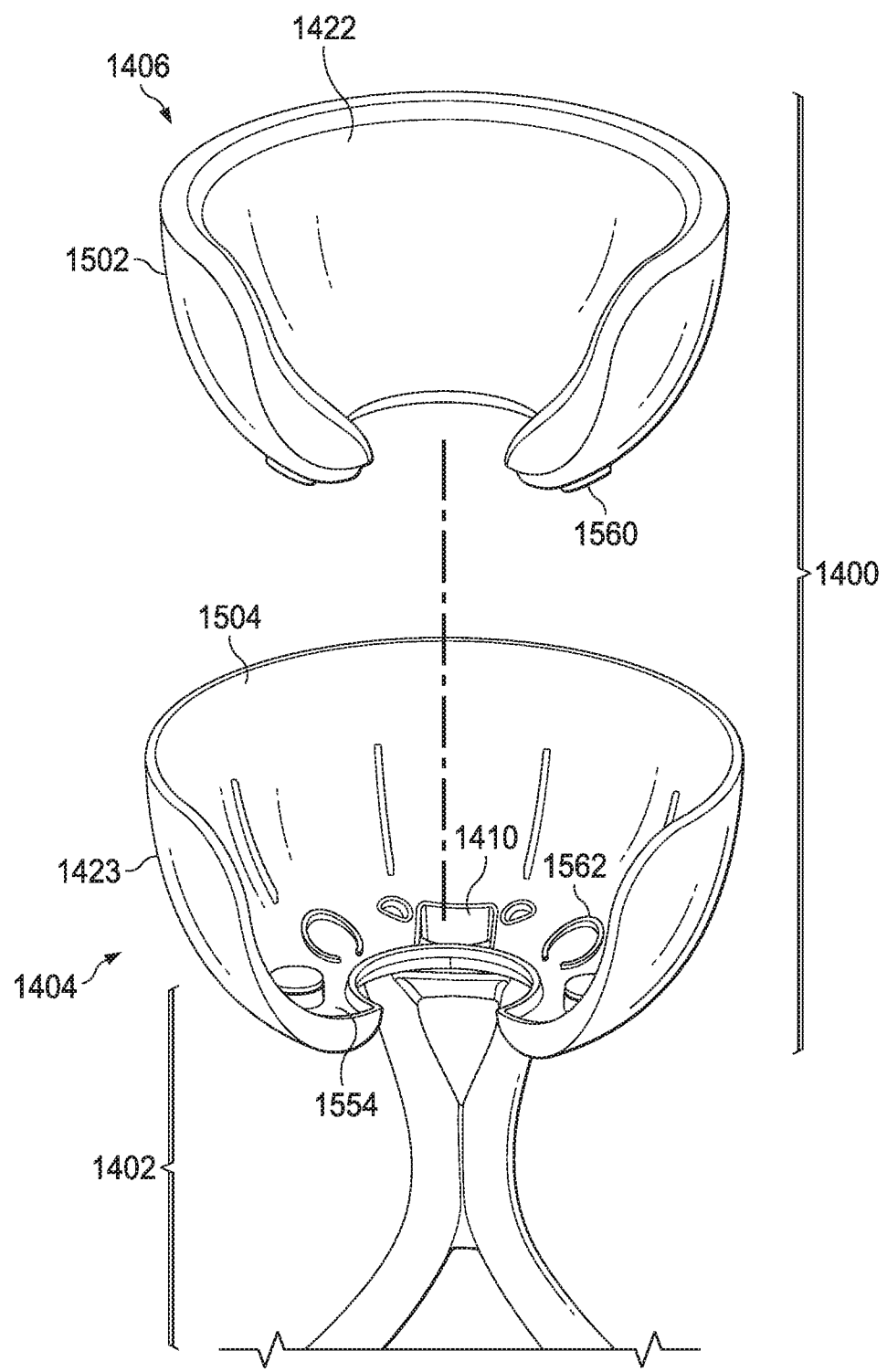
FIG. 15 is a schematic exploded view of the receptacle system of FIG. 14A.
Figure 16:
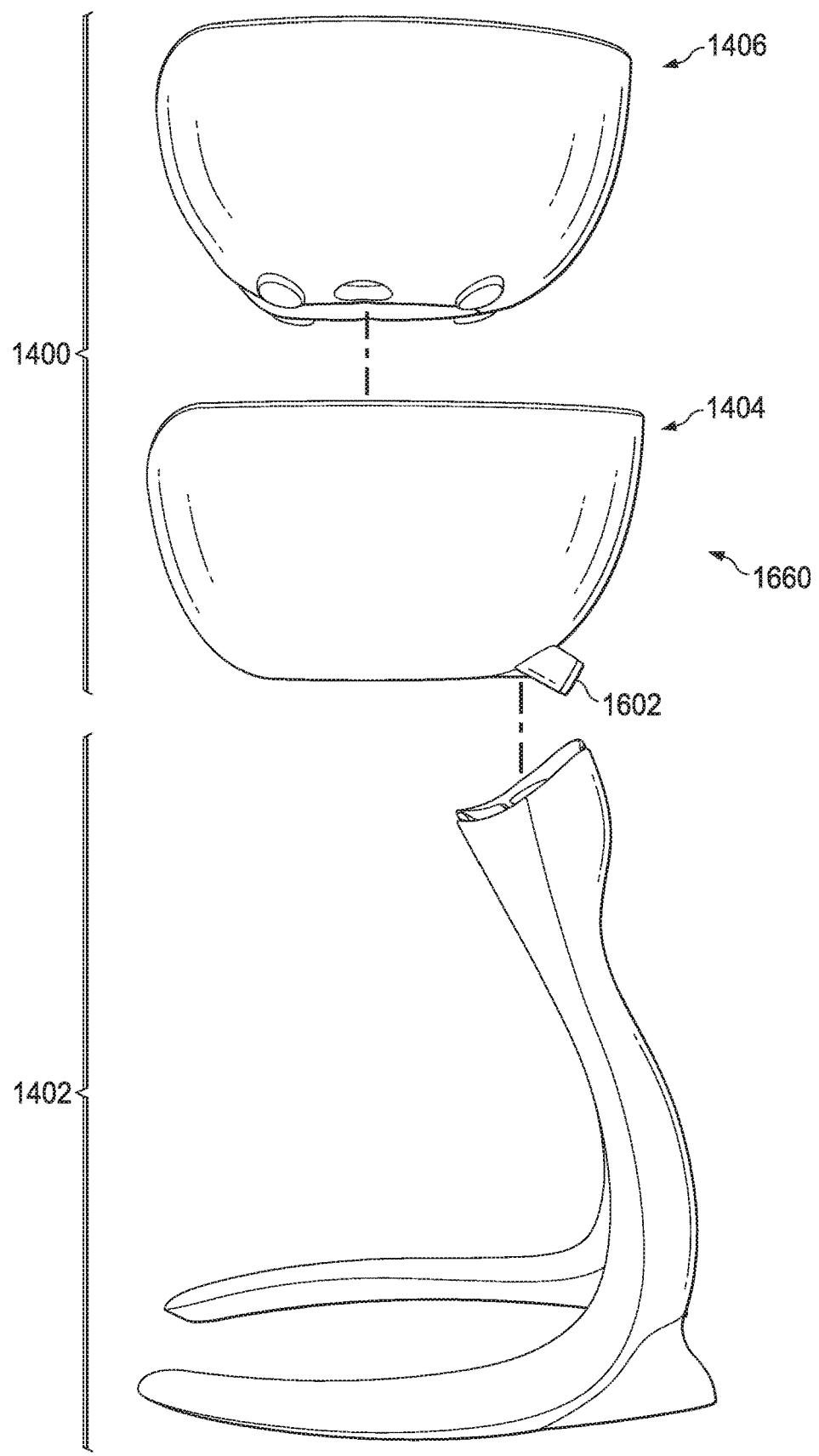
FIG. 16 is a schematic exploded view of the system of FIG. 14A

Referring to FIG. 15, the receptacle system 1400 can include an outer receptacle 1404 and an inner receptacle 1406. The inner receptacle 1406 can be removably coupled to the outer receptacle 1404. The outer receptacle 1404 can include a through hole 1410, and a protruding member 1602, as shown in FIG. 16.

Referring back to FIGS. 14A, 14B, the receptacle system 1400 defines a recess 1405, similar to the recess 104 of FIG. 1A. Similar to that mentioned with respect to the receptacle 100, the receptacle system 1400 includes a side opening 1420 that extends laterally from an inner wall portion 1422 to an outer wall portion 1423. The side opening 1420 may also extend vertically from a top opening 1424, defined by a top end portion 1426 of the receptacle system 1400, to a bottom opening 1428, defined by a bottom end portion 1430 of the receptacle system 1400. The outer wall portion 1423 and inner wall portion 1422 connect the top end portion 1426 and bottom end portion 1430.

As the inner receptacle 1406 is detachable from the outer receptacle 1404, the inner receptacle 1406 may be placed in a cooling environment (such as a freezer or refrigerator) or heating environment (such as an oven, microwave, or heat lamp) without the outer receptacle 1404 and/or the stand 1402. The cooling environment and heating environment may be any environment where the temperature is below or above room temperature, respectively. A user may save space in the cooling or heating environment by detaching the receptacle system 1400 from the stand 1402, and the inner receptacle 1406 from the outer receptacle 1404 and placing only the inner receptacle 1406 in the cooling or heating environment. In some examples, the receptacle system 1400 including the outer receptacle 1404 and the inner receptacle 1406 can be placed in the cooling or heating environment.

Figure 17:
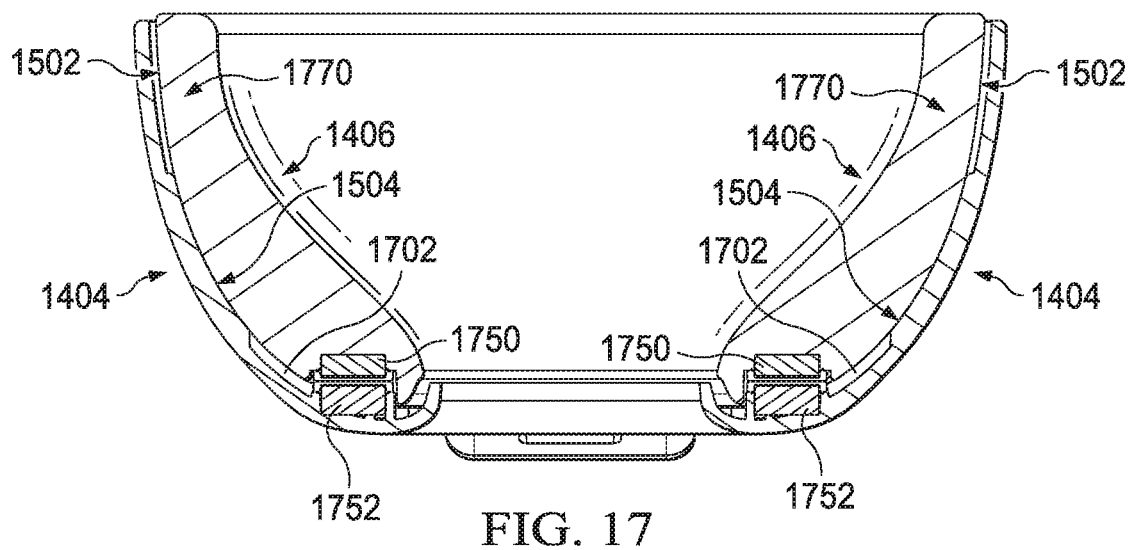
FIG. 17 is a schematic cut-way view of the receptacle system of FIG. 14A.

Referring to FIG. 15, the inner receptacle 1406 can include an inner surface 1502 that is positioned opposite to the inner wall portion 1422. The outer receptacle 1404 can include an inner surface 1504 that is opposite to the outer wall portion 1423. When the inner receptacle 1406 is coupled to the outer receptacle 1404, as shown in FIGS. 14A, 14B, the inner surface 1502 of the inner receptacle 1406 is positioned opposite to an inner surface 1504 of the outer receptacle 1404. Furthermore, as shown in FIG. 17, when the inner receptacle 1406 is coupled to the outer receptacle 1404, a cavity 1702 is defined between the inner receptacle 1406 and the outer receptacle 1404, and in particular, between the inner surface 1502 of the inner receptacle 1406 and the inner surface 1504 of the outer receptacle 1404. The cavity 1702 may collect condensation from the receptacle system 1400, described further herein.

Referring back to FIG. 15, the inner surface 1504 of the outer receptacle 1404 can include a bottom inner surface 1554. In some examples, the bottom inner surface 1554 can have a "bottom slope." Specifically, slope, as described herein, refers to the mathematical numerical descriptor. When the receptacle system 1400 is positioned on a surface (the stand 1402 is positioned on a surface and coupled to the receptacle system 1400), the bottom slope may have a magnitude such that the bottom inner surface 1554 is "pitched" or "at an angle" with respect to the surface the receptacle system 1400 is positioned on. The bottom inner surface 1554 can have a slope that is pitched towards the stand 1402.

Figure 18:
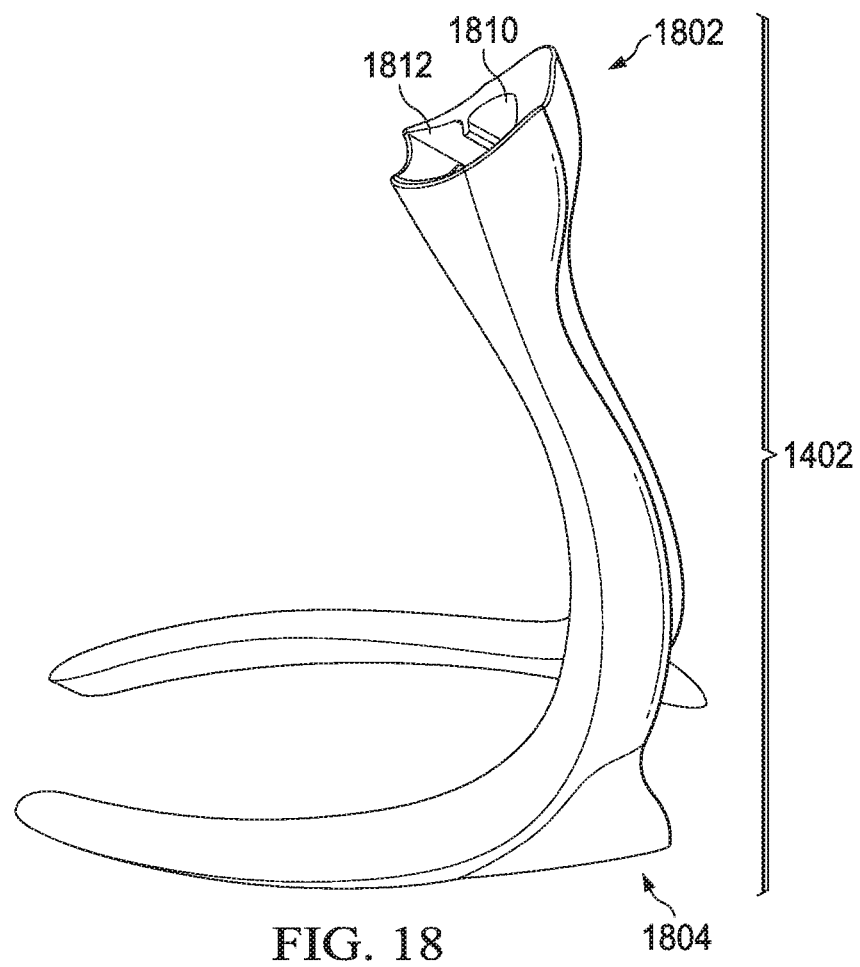
FIG. 18 is a schematic side view of the stand of FIG. 14A.

Referring to FIG. 18, the stand 1402 can include a top end 1802 positioned opposite to a bottom end 1804. When the receptacle system 1400 is coupled with the stand 1402, the top end of the stand 1402 is proximate to an attachment point between the receptacle system 1400 and the stand 1402.

The stand 1402 can further include a cavity 1810 and a reservoir 1812. The cavity 1810 is positioned proximate to the top end 1802 of the stand 1402. The cavity 1810 corresponds to the protruding member 1602 of the outer receptacle 1404, as shown in FIG. 16. That is, when the receptacle system 1400 is coupled to the stand 1402, at least a portion of the protruding member 1602 is positioned within the cavity 1810. The reservoir 1812 is positioned proximate to the top end 1802 of the stand 1402, and further positioned proximate to the cavity 1810. The reservoir 1812 corresponds to the through hole 1410 of the outer receptacle 1404. That is, when the receptacle system 1400 is coupled to the stand 1402, the reservoir 1812 is positioned proximate to the through hole 1410 of the outer receptacle 1404.

Referring to FIGS. 14B, 15, 17, and 18, condensation may form on the inner receptacle 1406—e.g., when the temperature of the inner receptacle 1406 differs from that of room temperature (the temperature of the environment containing the receptacle system 1400). To reduce unwanted user contact with condensation, the receptacle system 1400 and the stand 1402 may funnel such condensation into the reservoir 1812. Specifically, the condensation that forms on the inner receptacle 1406, and in particular, the inner surface 1502 of the inner receptacle 1406, may be captured in the cavity 1702 between the inner receptacle 1406 and the outer receptacle 1404. That is, as the condensation forms on the inner surface 1502 of the inner receptacle 1406, the condensation may be directed toward the bottom end portion 1430 of the receptacle system 1400 and further directed to the bottom inner surface 1554 of the outer receptacle 1404 (e.g., due to a gravitational force). In some examples, the condensation can remain within the cavity 1702 (e.g., on the inner surface 1502 of the inner receptacle 1406 and/or the bottom inner surface 1554 of the outer receptacle 1404). As such, condensation that can come into contact with a user of the receptacle system 1400 and the stand 1402, as well as the surface that the stand 1402 is positioned on, can be minimized and/or prevented.

In some examples, as the bottom inner surface 1554 is sloped towards the stand 1402, the condensation can further be directed towards a back end portion 1660 of the outer receptacle 1404 (e.g., due to a gravitational force), as shown in FIG. 16. As the condensation is directed towards the back end portion 1660 of the outer receptacle 1404, the condensation can further egress from the through hole 1410 of the outer receptacle 1404. As the reservoir 1812 is positioned proximate to the through hole 1410 of the outer receptacle 1404, when the condensation egresses from the through hole 1410, the condensation can be directed to the reservoir 1812. The reservoir 1812 can collect/hold such condensation. As such, condensation that can come into contact with a user of the receptacle system 1400 and the stand 1402, as well as the surface that the stand 1402 is positioned on, can be minimized and/or prevented.

Figure 24:
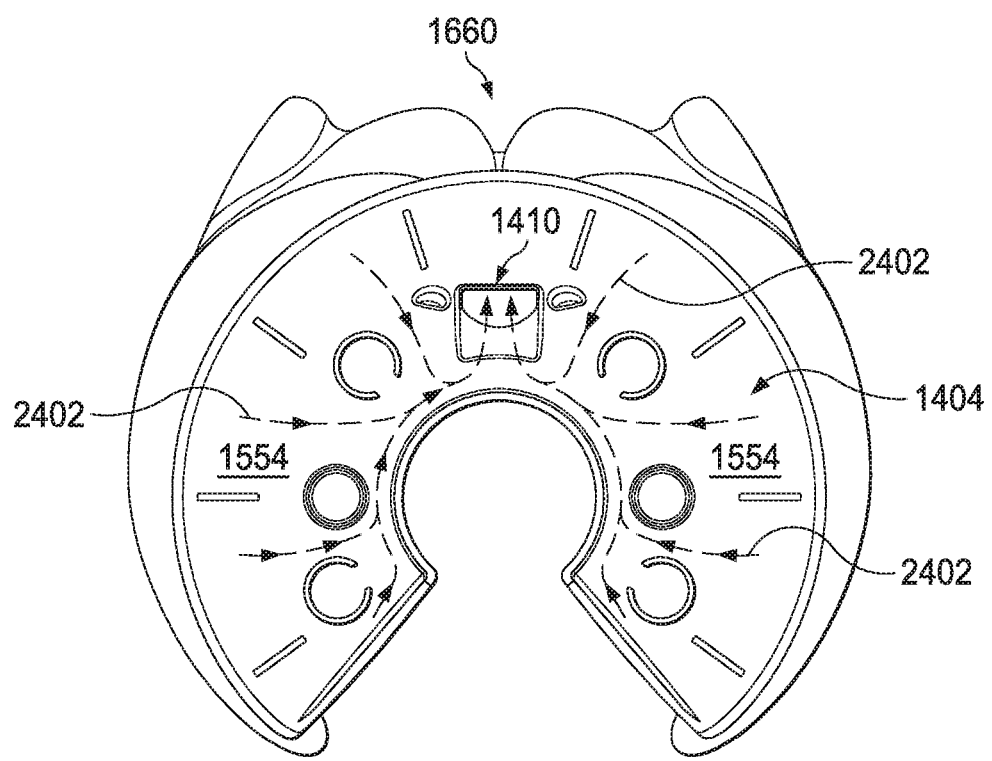
FIG. 24 is a schematic top-down cut-away view of the outer receptacle of the receptacle system of FIG. 14A.

Referring to FIGS. 15 and 24, in some examples, the outer receptacle 1404 can further include pathways 2402. The pathways 2402 can be between positioned between the inner surface 1504 of the outer receptacle 1404 and the inner surface 1502 of the inner receptacle 1406, and more specifically, positioned on (or included by) the bottom inner surface 1554 can include the pathways. The pathways 2402 can be conduits or contoured lines that facilitate movement of the condensation in a particular direction. The pathways 2402 can terminate at the through hole 1410 of the outer receptacle 1404. To that end, the pathways 2402 can facilitate directing the condensation towards the back end portion 1660 of the outer receptacle 1404, and further, direct the condensation to egress from the through hole 1410 of the outer receptacle, and ultimately, to the reservoir 1812.

In some examples, the inner receptacle 1406 can be removably coupled to the outer receptacle 1404 by one or more coupling means. For example, the inner receptacle 1406 can "clip-in" to the outer receptacle 1404 via one or more tabs 1560 of the inner receptacle 1406 coupling with one or more tab interlocking members 1562 of the outer receptacle 1404. For example, the inner receptacle 1406 can be removably coupled to the outer receptacle 1404 using any type of coupling members, such as screws, or other interlocking members. In some examples, the inner receptacle 1406 is permanently coupled to the outer receptacle 1404.

Referring to FIG. 17, in some examples, the inner receptacle 1406 and the outer receptacle 1404 include corresponding magnetic members to removably couple the inner receptacle 1406 to the outer receptacle 1404. For example, the inner surface 1504 of the outer receptacle 1404 can include a first set of magnetic members 1752 and the inner surface 1502 of the inner receptacle 1406 can include a second set of magnetic members 1750. The first set of magnetic members 1752 of the inner surface 1504 can correspond to the second set of magnetic members 1750 of the inner surface 1502. That is, when the inner receptacle 1406 is positioned proximate to the outer receptacle 1404, the corresponding sets of magnetic members 1750 and 1752 can be positioned proximate to one another such that the magnetic members 1750 and 1752 apply a magnetic coupling between the inner receptacle 1406 and the outer receptacle 1404. As such, the inner receptacle 1406 is removably coupled to the outer receptacle 1404 via magnetic forces between the first set of magnetic members 1752 of the inner surface 1504 and the second set of magnetic members 1750 of the inner surface 1502.

In some examples, the inner receptacle 1406 can at least partially include a magnetic material, or formed from a magnetic material. Further, the outer receptacle 1404 can include magnetic members to removably couple the inner receptacle 1406 to the outer receptacle 1404. For example, the inner surface 1504 of the outer receptacle 1404 can include magnetic members. When the inner receptacle 1406 is positioned proximate to the outer receptacle 1404, the magnetic members of the outer receptacle 1404 apply a magnetic coupling with the magnetic material of the inner receptacle 1406. As such, the inner receptacle 1406 is removably coupled to the outer receptacle 1404 via magnetic forces between the magnetic members of the outer receptacle 1404 and the magnetic material of the inner receptacle 1406.

In some examples, the outer receptacle 1404 can at least partially include a magnetic material, or formed from a magnetic material. Further, the inner receptacle 1406 can include magnetic members to removably couple the inner receptacle 1406 to the outer receptacle 1404. For example, the inner surface 1502 of the inner receptacle 1406 can include magnetic members. When the inner receptacle 1406 is positioned proximate to the outer receptacle 1404, the magnetic members of the inner receptacle 1406 apply a magnetic coupling with the magnetic material of the outer receptacle 1404. As such, the inner receptacle 1406 is removably coupled to the outer receptacle 1404 via magnetic forces between the magnetic members of the inner receptacle 1406 and the magnetic material of the outer receptacle 1404.

Figure 19:
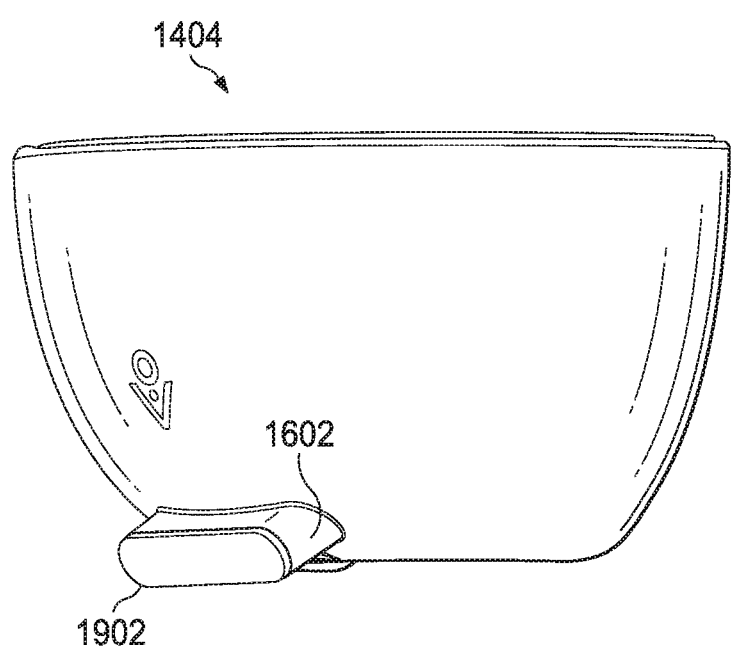
FIG. 19 is a back view of the receptacle system of FIG. 14A.
Figure 20:
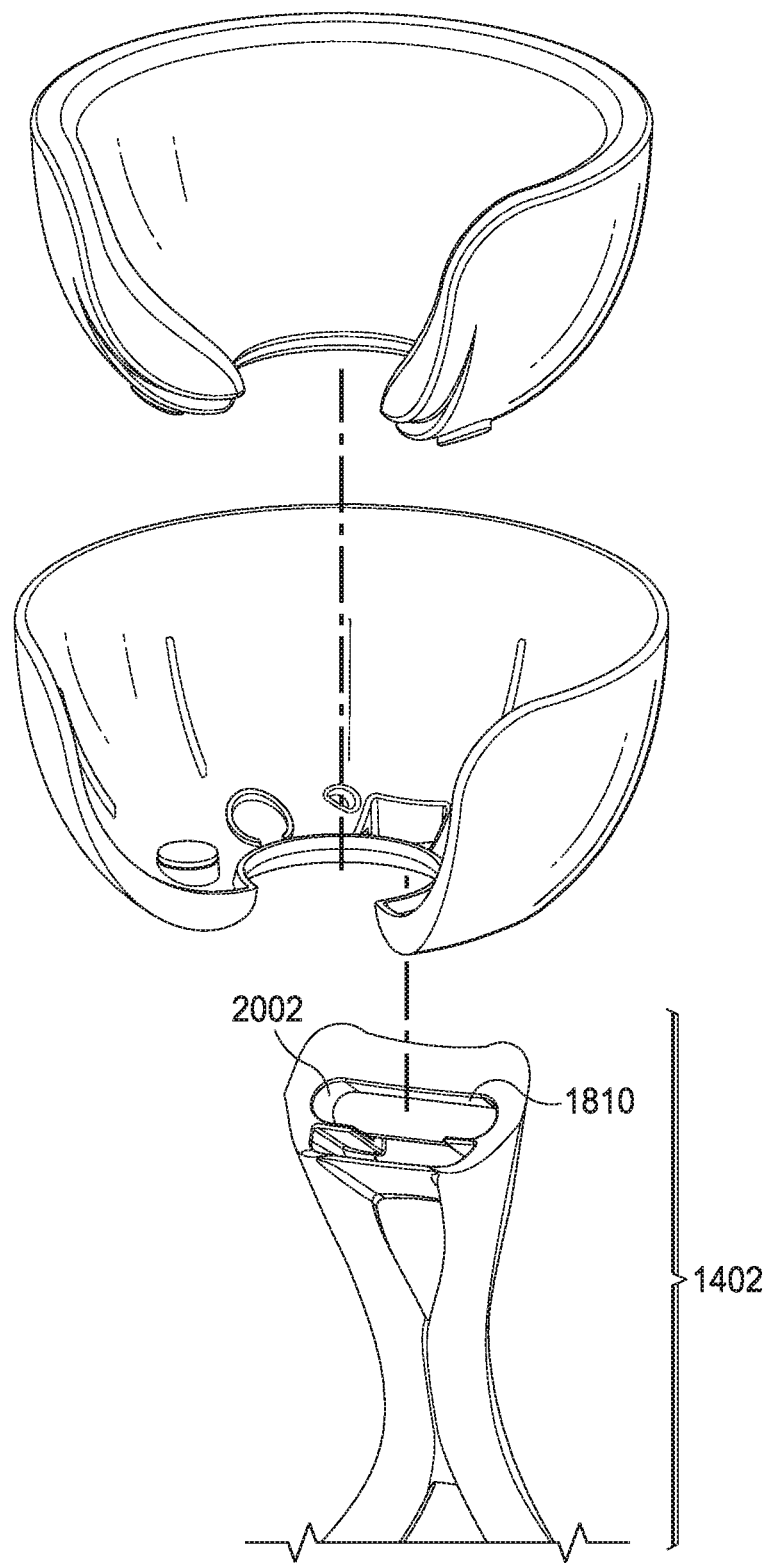
FIG. 20 is an exploded view of the system of FIG. 14A.

Referring to FIGS. 18 and 19, in some examples, the protruding member 1602 of the outer receptacle 1404 and the cavity 1810 of the stand 1402 can include corresponding magnetic members to couple the receptacle system 1400 to the stand 1402. For example, a surface 1902 of the protruding member 1602 can include a first set of magnetic members. However, other surfaces of the protruding member 1602 can additionally include magnetic members. Further, the magnetic members can be included within the protruding member 1602. Referring to FIG. 20, in some examples, a surface 2002 of the cavity 1810 can include a second set of magnetic members; however, other surfaces of the cavity 1810 can additionally include magnetic members. The first set of magnetic members of the protruding member 1602 can correspond to the set second of magnetic members of the cavity 1810. That is, when the receptacle system 1400 is coupled to the stand 1402, and specifically, the protruding member 1602 is positioned within the cavity 1810, the corresponding sets of magnetic members can be positioned proximate to one another such that the magnetic members apply a magnetic coupling between the protruding member 1602 and the cavity 1810. As such, the receptacle system 1400 is removably coupled to the stand 1402 via magnetic forces between the first set of magnetic members of the protruding member 1602 and the second set of magnetic members of the cavity 1810.

In some examples, the protruding member 1602 of the outer receptacle 1404 can at least partially include a magnetic material, or formed from a magnetic material. Further, the cavity 1810 of the stand 1402 can include magnetic members to removably couple the outer receptacle 1404 to the stand 1402. For example, the surface 2002 of the cavity 1810 can include magnetic members. When the protruding member 1602 is positioned within the cavity 1810, the magnetic members of the cavity 1810 apply a magnetic coupling with the magnetic material of the protruding member 1602. As such, the receptacle system 1400 is removably coupled to the stand 1402 via magnetic forces between the magnetic members of the cavity 1810 and the magnetic material of the protruding member 1602.

In some examples, the cavity 1810 of the stand 1402 can at least partially include a magnetic material, or formed from a magnetic material. Further, the protruding member 1602 of the outer receptacle 1404 can include magnetic members to removably couple the outer receptacle 1404 to the stand 1402. For example, the surface 1902 of the protruding member 1602 can include magnetic members. When the protruding member 1602 is positioned within the cavity 1810, the magnetic members of the protruding member 1602 apply a magnetic coupling with the magnetic material of the cavity 1810. As such, the receptacle system 1400 is removably coupled to the stand 1402 via magnetic forces between the magnetic members of the protruding member 1602 and the magnetic material of the cavity 1810.

Referring back to FIG. 17, the inner receptacle 1406 may include an inner cavity 1770, similar to the inner cavity 142 as described above with respect to FIGS. 2A through 2E. The inner cavity 1770 allows for efficient and long-lasting temperature control, insulation, or a combination thereof. For example, the inner cavity 1770 may carry and contain a liquid solution. When placed in the freezer, the liquid solution may freeze, thereby increasing the time and degree of drink temperature control and maintenance.

The inner cavity 1770 can be defined between the inner wall portion 1422 and the inner surface 1502 of the inner cavity 1770, and between the top end portion 1426 and bottom end portion 1430. The inner cavity 1770 may contain and carry air or gasses. The inner cavity 1770 may include an evacuated chamber. The evacuated chamber in the inner cavity 1770 may have a pressure less than 600 Torr, less than $10^{-1}$ Torr, less than $10^{-2}$ Torr, less than $10^{-3}$ Torr, or less than $10^{-4}$ Torr. The inner cavity 1770 may contain and carry solids, such as Styrofoam or plastic-coated wood. The inner cavity 1770 may contain and carry a liquid solution such that the inner cavity 1770 is partially or fully filled. The liquid solution may include water, gel such as alcohol gel, a solute, or a combination thereof. A liquid solution in the inner cavity 1770 may have a freezing point, for example, above the temperature of household freezers. The inner cavity 1770 may allow for longer temperature retention of the receptacle, thereby increasing the time the temperature of a drink is controlled. The inner cavity 1770 may include an expansion area, allowing room for a solution to expand, such that a frozen solution does not exert sufficient pressure on the boundaries of the inner cavity 1770 so as to damage the receptacle.

In some examples, the outer receptacle 1404 can additionally include an inner cavity, similar to the inner cavities 1770 and 142.

Figure 21:
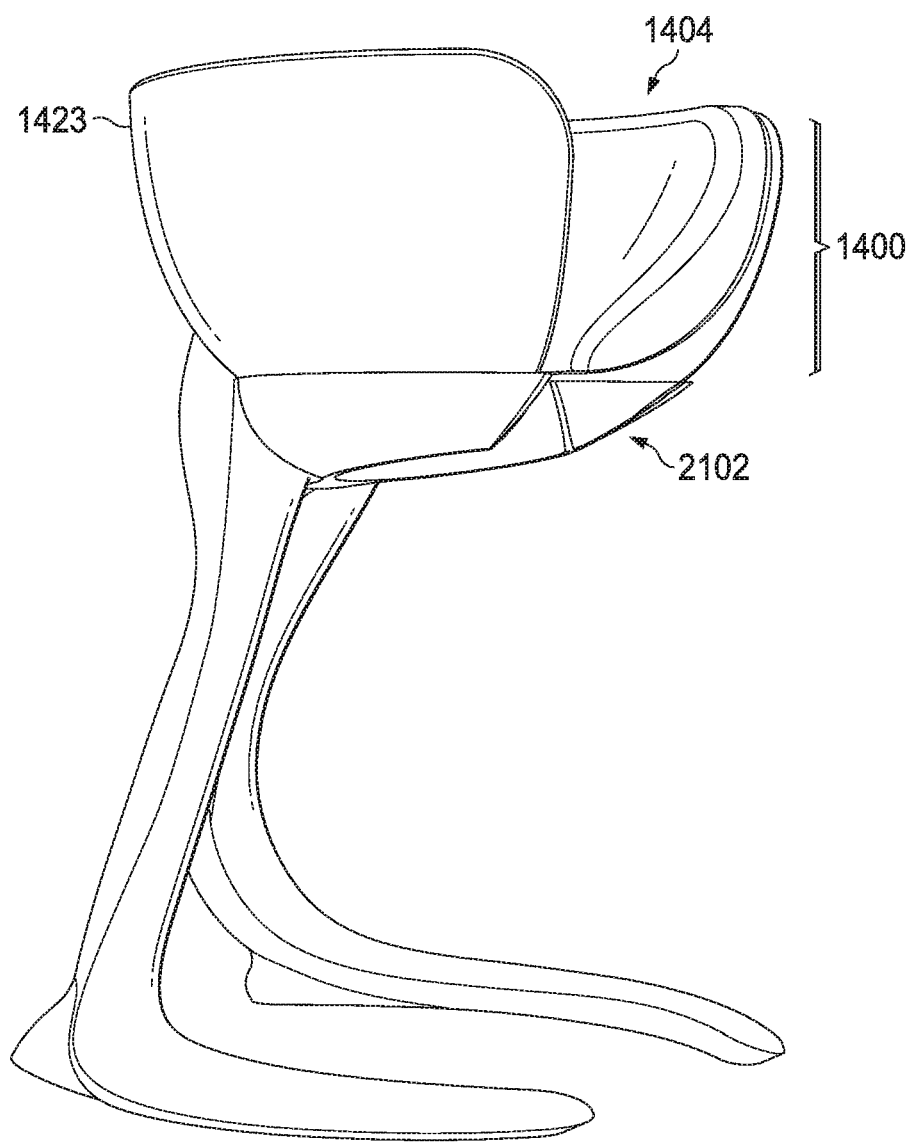
FIG. 21 is a perspective view of the system of FIG. 14A, including a drip tray.
Figure 25:
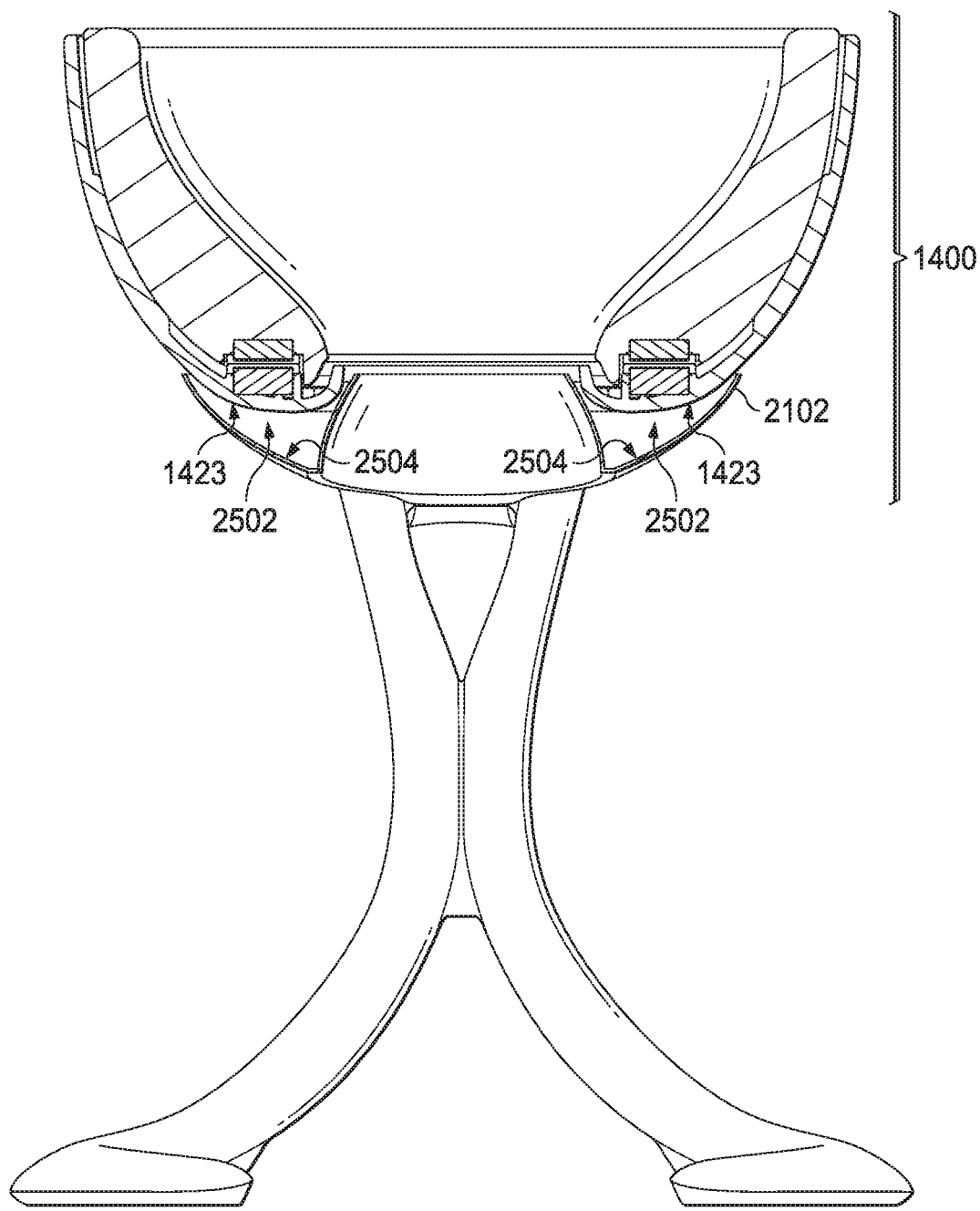
FIG. 25 is a schematic side-view cut-away view of the drop tray of FIG. 21.

Referring to FIGS. 21 and 25, the receptacle system 1400 can further include a drip tray 2102. The drip tray 2102 can be coupled to the bottom end portion 1430 of the receptacle system 1400. The drip tray 2102 can be removably coupled to the receptacle system 1400, or permanently coupled to the receptacle system 1400. In some examples, the drip tray 2102 is additionally coupled to the stand 1402—at the top end 1802 of the stand 1402. In some examples, the drip tray 2102 is only coupled to the stand 1402 (in lieu of being coupled to the receptacle system 1400). The drip tray 2102 can include a cavity 2502 positioned between an inner surface 2504 of the drip tray 2102 and the outer wall portion 1423 at the bottom end portion 1430 of the receptacle system 1400.

The cavity 2502 can collect/store condensation that may form on the outer wall portion 1423 of the outer receptacle 1404. Specifically, condensation can accumulate on the outer wall portion 1423, e.g., when the temperature of the outer receptacle 1404 differs from that of room temperature (the temperature of the environment containing the receptacle system 1400). To reduce unwanted user contact with the condensation, the condensation can be directed towards the bottom end portion 1430 of the receptacle system 1400 (e.g., due to a gravitational force). In some examples, the condensation can overcome capillary forces that may "hold" or "maintain" the condensation at the bottom end portion 1430 of the outer receptacle 1404. When the condensation overcomes such capillary forces, the condensation can "drop" into the cavity 2502 of the drip tray 2102. In some examples, the cavity 2502 can hold such condensation. In some examples, the drip tray 2102 can funnel such condensation into the reservoir 1812 of the stand 1402. Specifically, the condensation that is captured by the cavity 2502 may be directed to the reservoir 1812 (e.g., due to a gravitational force). As such, condensation that can come into contact with a user of the receptacle system 1400 and the stand 1402, as well as the surface that the stand 1402 is positioned on, can be minimized and/or prevented.

Figure 22:
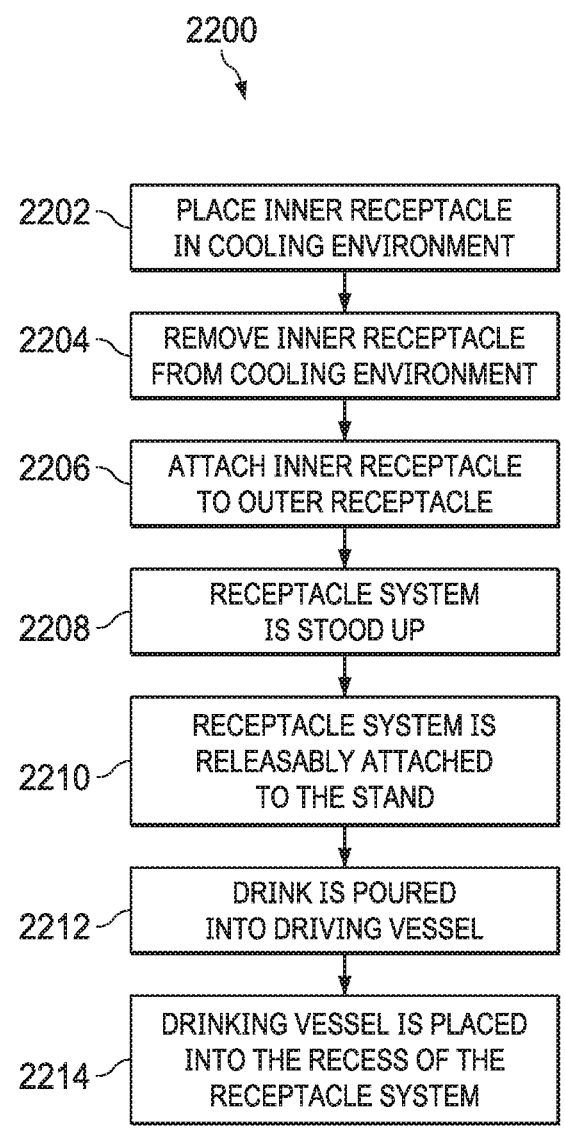
FIG. 22 is a flow chart of a method for controlling the temperature of a drink.

Disclosed herein are methods to control a temperature of a drink. The methods allow for better enjoyment of the drink by the user by enabling viewing of the drink, saving space, and efficiently controlling the drink's temperature. FIG. 22 is a flow chart of an exemplary method 2200 for controlling the temperature of a drink. The method may use components and systems as described elsewhere in this disclosure. For example, the method may use the receptacle system 1400 and/or the stand 1402 as described with respect to FIGS. 14-21 and 23-25.

Figure 23:
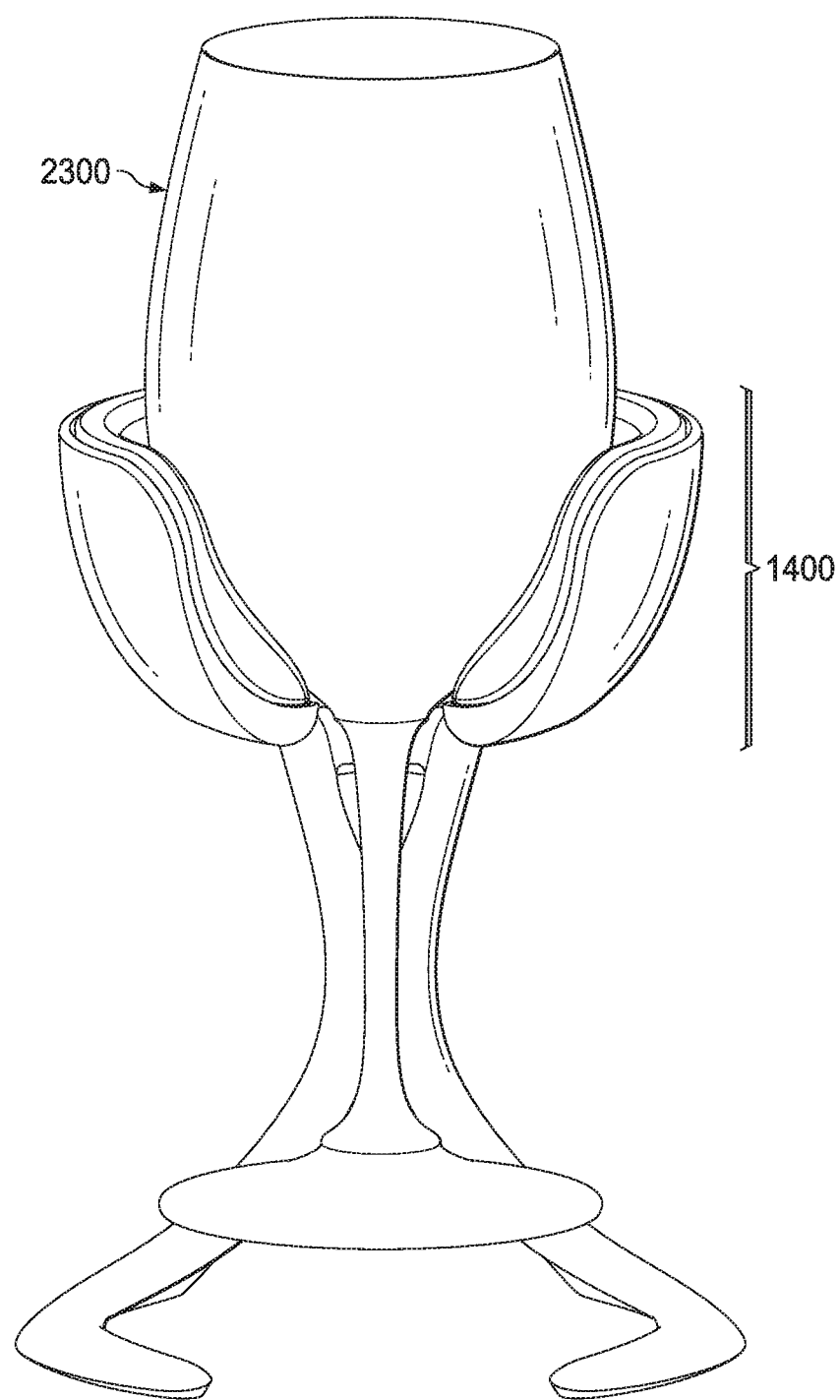
FIG. 23 a schematic view of the system of FIG. 14A, the system holding a drinking vessel.

The inner receptacle 1406 is placed in a cooling environment with a cooling temperature (2202). The cooling temperature is below a room temperature of an environment containing the receptacle system 1400. The inner receptacle 1406 is removed from the cooling environment (2204). The inner receptacle 1406 is attached to the outer receptacle 1404 (2206). The inner receptacle 1406 and the outer receptacle 1404 form the receptacle system 1400. The receptacle system 1400 is stood upright (2208). The receptacle system 1400 is releasably attached to the stand 1402 (2210). A drink is poured into a drinking vessel (2212). The drinking vessel is placed into the recess 1405 while the receptacle system 1400 is standing upright (2214). For example, FIG. 23 illustrates a drinking vessel 2300 placed into the recess 1405 while the receptacle system 1400 is standing upright.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system for regulating a temperature of a drink, the system comprising:
    a receptacle system defining a recess for receiving a drinking vessel, including:
        an outer receptacle, and
        an inner receptacle that is removably couplable to the outer receptacle,
        wherein a cavity is defined between the outer receptacle and the inner receptacle,
    the receptacle system comprising a top end portion, a bottom end portion, an inner wall portion, and an outer wall portion, the top end portion defines a top opening of the recess;
    a side opening extending laterally from the inner wall portion to the outer wall portion, and vertically from the top opening to a bottom opening defined by the bottom end portion of the receptacle system.

2. The system of claim 1, further comprising:
    an elongated stand for holding the receptacle system, the stand releasably attached to the receptacle system.

3. The system of claim 2, wherein the stand includes a top end positioned opposite a bottom end, the top end of the stand proximate to an attachment point with the receptacle system, the stand further including a reservoir proximate to the top end of the stand.

4. The system of claim 3, wherein the outer receptacle includes a through hole positioned proximate to the reservoir when the receptacle system is attached to the stand.

5. The system of claim 4, wherein the outer receptacle includes one or more pathways positioned between an inner surface of the outer receptacle and an inner surface of the inner receptacle, the pathways terminating at the through hole.

6. The system of claim 2, wherein the stand includes a top end positioned opposite a bottom end, the top end of the stand proximate to an attachment point with the receptacle system, the stand further including a cavity proximate to the top end of the stand.

7. The system of claim 6, wherein the outer receptacle includes a protruding member, wherein when the receptacle system is attached to the stand, the protruding member is at least partially positioned within the cavity.

8. The system of claim 7, wherein the protruding member of the outer receptacle and the cavity of the stand include corresponding magnetic members to couple the receptacle system to the stand.

9. The system of claim 2, wherein the outer receptacle includes an inner surface having a bottom slope that is pitched at an angle towards the elongated stand.

10. The system of claim 1, wherein the inner receptacle and the outer receptacle include corresponding magnetic members to couple the inner receptacle to the outer receptacle.

11. The system of claim 1, wherein the outer wall portion and the inner wall portion connect the top end portion and bottom end portion respectively.

12. A system for regulating a temperature of a drink, the system comprising:
    a receptacle system defining a recess for receiving a drinking vessel, including:
        an outer receptacle including a through hole and a protruding member,
        an inner receptacle that is removably couplable to the outer receptacle,
        the receptacle system comprising a top end portion, a bottom end portion, an inner wall portion, and an outer wall portion, the top end portion defines a top opening of the recess,
        wherein a cavity is defined between the outer receptacle and the inner receptacle; and
    a stand for holding the receptacle system, the stand releasably attached to the receptacle system; and
    the stand including a top end positioned opposite a bottom end, the top end of the stand proximate to an attachment point with the receptacle system, the stand further including i) a cavity proximate to the top end of the stand and corresponding to the protruding member for attaching the receptacle system to the stand and ii) a reservoir proximate to the top end of the stand and the through hole of the outer receptacle.

13. The system of claim 12, wherein the outer receptacle includes one or more pathways positioned between an inner surface of the outer receptacle and an inner surface of the inner receptacle, the pathways terminating at the through hole.

14. The system of claim 12, wherein when the receptacle system is attached to the stand, the protruding member is at least partially positioned within the cavity.

15. The system of claim 14, wherein the protruding member of the outer receptacle and the cavity of the stand include corresponding magnetic members to couple the receptacle system to the stand.

16. The system of claim 12, wherein the inner receptacle and the outer receptacle include corresponding magnetic members to couple the inner receptacle to the outer receptacle.

* * * * *